US011294233B2

(12) United States Patent
Robinson et al.

(10) Patent No.: US 11,294,233 B2
(45) Date of Patent: Apr. 5, 2022

(54) DIRECTIONAL ILLUMINATION APPARATUS AND PRIVACY DISPLAY

(71) Applicant: REALD SPARK, LLC, Beverly Hills, CA (US)

(72) Inventors: Michael G. Robinson, Boulder, CO (US); Graham J. Woodgate, Henley-on-Thames (GB)

(73) Assignee: ReaID Spark, LLC, Beverly Hills, CA (US)

( * ) Notice: Subject to any disclaimer, the term of this patent is extended or adjusted under 35 U.S.C. 154(b) by 0 days.

(21) Appl. No.: 16/999,694

(22) Filed: Aug. 21, 2020

(65) Prior Publication Data
US 2021/0055608 A1  Feb. 25, 2021

Related U.S. Application Data

(60) Provisional application No. 62/890,685, filed on Aug. 23, 2019.

(51) Int. Cl.
G02F 1/13357  (2006.01)
G02F 1/1337  (2006.01)
(Continued)

(52) U.S. Cl.
CPC ..... *G02F 1/133606* (2013.01); *G02B 6/0021* (2013.01); *G02B 6/0023* (2013.01);
(Continued)

(58) Field of Classification Search
CPC . F21Y 2105/10; G02B 6/0021; G02B 6/0023; G02F 1/133602–133614; G02F 1/133753
See application file for complete search history.

(56) References Cited

U.S. PATENT DOCUMENTS 5,184,114 A   2/1993 Brown
5,812,105 A   9/1998 Ven
(Continued)

FOREIGN PATENT DOCUMENTS

CN   102859268 A   1/2013
CN   103117348 A   5/2013
(Continued)

OTHER PUBLICATIONS

EP18200530.6—European Search Report of the European Patent Office dated May 23, 2019.
(Continued)

*Primary Examiner* — Keith G. Delahoussaye
(74) *Attorney, Agent, or Firm* — Penny L. Lowry

(57) ABSTRACT

A directional backlight comprises an array of mini-LEDs and an optical waveguide with first and second light guiding surfaces comprising apertures aligned to the array of mini-LEDs. A light turning element is arranged to collect light output from the waveguide for input into a spatial light modulator. The waveguide has an array of light deflecting features arranged on at least one guiding surface and an opposing surface so that a collimated output is provided with reduced power consumption and increased dynamic range in comparison to conventional backlights. A switchable privacy display with high visual security in privacy mode may be achieved.

35 Claims, 19 Drawing Sheets

(51) Int. Cl.
*F21V 8/00* (2006.01)
*G02F 1/1335* (2006.01)
*F21Y 105/10* (2016.01)

(52) U.S. Cl.
CPC .. *G02F 1/133603* (2013.01); *G02F 1/133753* (2013.01); *F21Y 2105/10* (2016.08); *G02F 1/133607* (2021.01)

(56) References Cited

U.S. PATENT DOCUMENTS

| | | | |
|---|---|---|---|
| 6,547,423 | B2 | 4/2003 | Marshall et al. |
| 6,570,324 | B1 | 5/2003 | Tutt et al. |
| 7,014,964 | B1 | 3/2006 | Hsu et al. |
| 7,171,874 | B1 | 2/2007 | Huang |
| 7,863,614 | B2 | 1/2011 | Toyama et al. |
| 7,994,531 | B2 | 8/2011 | Lin et al. |
| 9,519,153 | B2 | 12/2016 | Robinson et al. |
| 10,121,772 | B1 | 11/2018 | Wu et al. |
| 10,126,575 | B1 | 11/2018 | Robinson et al. |
| 10,303,030 | B2 | 5/2019 | Robinson et al. |
| 10,533,730 | B2 | 1/2020 | Harrold et al. |
| 2004/0080938 | A1 | 4/2004 | Holman et al. |
| 2004/0089935 | A1 | 5/2004 | Lehner |
| 2004/0126911 | A1 | 7/2004 | Kimura |
| 2004/0161871 | A1 | 8/2004 | Omori |
| 2004/0218390 | A1 | 11/2004 | Holman et al. |
| 2004/0239243 | A1 | 12/2004 | Roberts et al. |
| 2004/0263061 | A1* | 12/2004 | Ishikawa ............. H01L 51/5275 313/501 |
| 2005/0111100 | A1 | 5/2005 | Mather et al. |
| 2005/0219693 | A1 | 10/2005 | Hartkop et al. |
| 2006/0152931 | A1 | 7/2006 | Holman |
| 2006/0256255 | A1* | 11/2006 | Minami ............. G02F 1/133606 349/65 |
| 2006/0002902 | A1 | 12/2006 | Cok et al. |
| 2007/0007237 | A1 | 1/2007 | Wu et al. |
| 2007/0019131 | A1* | 1/2007 | Choi ..................... G02B 5/0215 349/65 |
| 2007/0047254 | A1* | 3/2007 | Schardt .............. G02B 19/0057 362/607 |
| 2007/0116424 | A1* | 5/2007 | Ting ..................... G02B 6/0028 385/147 |
| 2007/0165394 | A1* | 7/2007 | Chang ............... G02F 1/133606 362/97.3 |
| 2007/0176195 | A1* | 8/2007 | Kuiseko ................. G02B 5/045 257/98 |
| 2007/0242477 | A1 | 10/2007 | Yoo et al. |
| 2007/0256453 | A1 | 11/2007 | Barnes et al. |
| 2008/0043466 | A1 | 2/2008 | Chakmakjian et al. |
| 2008/0089093 | A1* | 4/2008 | Miller ............... G02F 1/133605 362/613 |
| 2008/0123350 | A1* | 5/2008 | Choe ..................... G02B 6/0021 362/331 |
| 2008/0225523 | A1 | 9/2008 | Samber et al. |
| 2008/0237612 | A1 | 10/2008 | Cok |
| 2008/0258162 | A1 | 10/2008 | Koung et al. |
| 2008/0315755 | A1 | 12/2008 | Han |
| 2009/0001869 | A1 | 1/2009 | Tanimoto et al. |
| 2009/0086508 | A1 | 4/2009 | Bierhuizen |
| 2009/0109656 | A1* | 4/2009 | Chang ................... G02B 5/045 362/97.1 |
| 2009/0128735 | A1 | 5/2009 | Larson et al. |
| 2009/0242929 | A1 | 10/2009 | Lin |
| 2009/0268428 | A1* | 10/2009 | Tsukada ............... G02B 5/0278 362/97.1 |
| 2009/0296389 | A1* | 12/2009 | Hsu ........................ H01L 33/56 362/235 |
| 2010/0061096 | A1 | 3/2010 | Sato |
| 2010/0097809 | A1 | 4/2010 | Munro et al. |
| 2010/0165635 | A1 | 7/2010 | Chen et al. |
| 2010/0171215 | A1 | 7/2010 | Fischer et al. |
| 2010/0172152 | A1 | 7/2010 | Boonekamp |
| 2010/0195330 | A1 | 8/2010 | Schaefer et al. |
| 2010/0258543 | A1 | 10/2010 | Mizuno et al. |
| 2010/0295762 | A1* | 11/2010 | Yeom ................ G02F 1/133606 345/87 |
| 2010/0317132 | A1 | 12/2010 | Rogers et al. |
| 2011/0003410 | A1 | 1/2011 | Tsay et al. |
| 2011/0018860 | A1 | 1/2011 | Parry-Jones et al. |
| 2011/0038150 | A1 | 2/2011 | Woodgate et al. |
| 2011/0090672 | A1* | 4/2011 | Zhu ...................... G02B 6/0021 362/97.1 |
| 2011/0151602 | A1 | 6/2011 | Speier |
| 2011/0194034 | A1* | 8/2011 | Shimizu ............... G02B 6/0073 348/739 |
| 2011/0255303 | A1 | 10/2011 | Nichol et al. |
| 2012/0086875 | A1 | 4/2012 | Yokota |
| 2012/0119237 | A1 | 5/2012 | Leatherdale et al. |
| 2012/0140462 | A1 | 6/2012 | Pickard |
| 2012/0147296 | A1 | 6/2012 | Montgomery et al. |
| 2012/0258963 | A1 | 10/2012 | Berger et al. |
| 2012/0320627 | A1 | 12/2012 | Araki et al. |
| 2013/0033849 | A1 | 2/2013 | Roberts et al. |
| 2013/0039062 | A1 | 2/2013 | Vinther et al. |
| 2013/0107525 | A1 | 5/2013 | Woodgate et al. |
| 2013/0121000 | A1 | 5/2013 | Lee et al. |
| 2013/0258663 | A1 | 10/2013 | Woodgate et al. |
| 2013/0293793 | A1 | 11/2013 | Lu |
| 2014/0098418 | A1 | 4/2014 | Lin |
| 2014/0140654 | A1 | 5/2014 | Brown et al. |
| 2014/0186979 | A1 | 7/2014 | Tu et al. |
| 2014/0211462 | A1* | 7/2014 | Keller ................. G02B 6/0068 362/231 |
| 2014/0211503 | A1* | 7/2014 | Tarsa ................... G02B 6/0036 362/608 |
| 2014/0240839 | A1* | 8/2014 | Yang ..................... G02B 5/021 359/599 |
| 2014/0316742 | A1 | 10/2014 | Sun et al. |
| 2015/0054011 | A1 | 2/2015 | Koizumi et al. |
| 2015/0062490 | A1 | 3/2015 | Kwon |
| 2015/0160396 | A1 | 6/2015 | Wilcox et al. |
| 2015/0268479 | A1 | 9/2015 | Woodgate et al. |
| 2015/0268513 | A1 | 9/2015 | Chang et al. |
| 2015/0295154 | A1 | 10/2015 | Tu et al. |
| 2015/0308635 | A1 | 10/2015 | Li et al. |
| 2016/0018077 | A1 | 1/2016 | Mallory et al. |
| 2016/0211413 | A1 | 7/2016 | Park et al. |
| 2016/0299281 | A1 | 10/2016 | Robinson et al. |
| 2017/0031085 | A1 | 2/2017 | Lim |
| 2017/0045666 | A1 | 2/2017 | Vasylyev |
| 2017/0059127 | A1 | 3/2017 | Jansma et al. |
| 2017/0102127 | A1 | 4/2017 | Woodgate et al. |
| 2017/0139114 | A1 | 5/2017 | Woodgate et al. |
| 2017/0154919 | A1 | 6/2017 | Chen et al. |
| 2017/0161179 | A1 | 6/2017 | Maple et al. |
| 2017/0205959 | A1 | 7/2017 | Seong |
| 2017/0248289 | A1 | 8/2017 | Vasylyev |
| 2017/0261179 | A1 | 9/2017 | Wu et al. |
| 2018/0014007 | A1 | 1/2018 | Brown |
| 2018/0226384 | A1 | 8/2018 | Park et al. |
| 2018/0321553 | A1 | 11/2018 | Robinson et al. |
| 2019/0086706 | A1 | 3/2019 | Robinson et al. |
| 2019/0139243 | A1 | 5/2019 | You et al. |
| 2019/0220121 | A1 | 7/2019 | Kim et al. |
| 2019/0250458 | A1 | 8/2019 | Robinson et al. |
| 2019/0265478 | A1 | 8/2019 | Cok et al. |
| 2019/0278135 | A1 | 9/2019 | Woodgate et al. |
| 2019/0294004 | A1* | 9/2019 | Hashimoto ........... H01L 33/507 |
| 2019/0377067 | A1 | 12/2019 | Han et al. |
| 2020/0049876 | A1* | 2/2020 | Watanabe ........... G02B 6/0043 |
| 2020/0159055 | A1 | 5/2020 | Robinson et al. |
| 2020/0166783 | A1 | 5/2020 | Roy et al. |
| 2020/0259307 | A1 | 8/2020 | Sharma et al. |
| 2020/0321553 | A1 | 10/2020 | Kwon et al. |
| 2020/0355896 | A1 | 11/2020 | Woodgate et al. |

FOREIGN PATENT DOCUMENTS

| | | |
|---|---|---|
| CN | 105556374 A | 5/2016 |
| CN | 105849595 A | 8/2016 |
| DE | 102010031945 A1 | 1/2012 |

(56) References Cited

FOREIGN PATENT DOCUMENTS

| | | | |
|---|---|---|---|
| EP | 1387412 A1 | 2/2004 | |
| EP | 1835550 A2 | 9/2007 | |
| EP | 1890343 A1 | 2/2008 | |
| EP | 1986023 A1 | 10/2008 | |
| EP | 2182783 A2 | 5/2010 | |
| EP | 2595295 A1 | 5/2013 | |
| GB | 2464102 A | 4/2010 | |
| GB | 2484711 A | 4/2012 | |
| JP | 2000323755 A | 11/2000 | |
| JP | 2007294411 A | 11/2007 | |
| JP | 2009295309 A | 12/2009 | |
| JP | 2010238846 A | 10/2010 | |
| JP | 2013219397 A | 10/2013 | |
| WO | 2006115313 A1 | 11/2006 | |
| WO | 2007074932 A1 | 7/2007 | |
| WO | 2010038025 A2 | 4/2010 | |
| WO | 2010038025 A3 | 6/2010 | |
| WO | 2011131200 A1 | 10/2011 | |
| WO | 2012052722 A2 | 4/2012 | |
| WO | 2012052723 A1 | 4/2012 | |
| WO | 2013064801 A1 | 5/2013 | |
| WO | 2013112435 A1 | 8/2013 | |
| WO | 2014043384 A1 | 3/2014 | |
| WO | WO-2015089517 A1 * | 6/2015 | ........... G02B 6/0078 |
| WO | 2017007770 A2 | 1/2017 | |
| WO | 2018185475 A1 | 10/2018 | |
| WO | 2018185476 A1 | 10/2018 | |
| WO | 2018208618 A1 | 11/2018 | |
| WO | 2019067846 A1 | 4/2019 | |
| WO | WO-2019107826 A1 * | 6/2019 | ....... G02F 1/133602 |

OTHER PUBLICATIONS

International search report and written opinion of international searching authority for PCT application PCT/GB2018/050893 dated Aug. 27, 2018.

International search report and written opinion of international searching authority for PCT application PCT/GB2018/050894 dated Aug. 27, 2018.

International search report and written opinion of international searching authority for PCT application PCT/GB2019/050076 dated May 9, 2019.

International search report and written opinion of international searching authority for PCT application PCT/US2019/021570 dated May 24, 2019.

International search report and written opinion of international searching authority for PCT application PCT/US2019/031526 dated Jul. 29, 2019.

International search report and written opinion of international searching authority for PCT application PCT/US2020/040686 dated Nov. 20, 2020.

International search report and written opinion of international searching authority for PCT application PCT/US2020/047383 dated Dec. 4, 2020.

International search report and written opinion of international searching authority for PCT application PCT/US2020/050460 dated Dec. 8, 2020.

International search report and written opinion of international searching authority for PCT application PCT/US2020/053864 dated Dec. 14, 2020.

International search report and written opinion of international searching authority for PCT application PCT/US2020/050527 dated Feb. 3, 2021.

International search report and written opinion of international searching authority for PCT application PCT/US2020/053825 dated Dec. 30, 2020.

International search report and written opinion of international searching authority for PCT application PCT/US2021/018544 dated Apr. 29, 2021.

CN201980016364.X Notification of the First Office Action dated Dec. 27, 2021.

CN201880036805.8 Notification of the First Office Action dated Jul. 23, 2021.

CN201880036842.9 Notification of the First Office Action dated Jul. 23, 2021.

EP19804311.9—Extended European Search Report of the European Patent Office dated Dec. 15, 2021.

* cited by examiner

DIRECTIONAL ILLUMINATION APPARATUS AND PRIVACY DISPLAY

TECHNICAL FIELD

This disclosure generally relates to illumination from light modulation devices, and more specifically relates to optical stacks for providing narrow angle illumination for use in display including privacy display and for use in environmental illumination.

BACKGROUND

Privacy displays provide image visibility to a primary user that is typically in an on-axis position and reduced visibility of image content to a snooper, that is typically in an off-axis position. A privacy function may be provided by micro-louvre optical films that transmit a high luminance from a display in an on-axis direction with low luminance in off-axis positions, however such films are not switchable, and thus the display is limited to privacy only function.

Switchable privacy displays may be provided by control of the off-axis optical output from a spatial light modulator. Control may be provided by means of off-axis luminance reduction, for example by means of switchable polarisation control layers between display polarisers and additional polarisers.

Backlights with reduced off-axis luminance can be used to provide or enhance the privacy function. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety.

Backlights formed from arrays of individually controllable light sources arranged in series with a liquid crystal spatial light modulator can provide high dynamic range by reducing output luminous flux of the light sources in alignment with low luminance regions of the image displayed on the spatial light modulator.

BRIEF SUMMARY

According to a first aspect of the present disclosure, there is provided an illumination apparatus for providing illumination over a predetermined area, the illumination apparatus comprising: a two-dimensional array of light emitting diodes disposed on a support substrate, the light emitting diodes being arrayed across the predetermined area; a waveguide comprising: an array of light input features, each light input feature being aligned to at least one light emitting diode of the array of light emitting diodes, the light input features being arranged to input light from the at least one aligned light emitting diode into the waveguide; and front and rear light guiding surfaces extending across said predetermined area and arranged to guide light received from the array of light emitting diodes along the optical waveguide by total internal reflection, wherein at least one of the front and rear light guiding surfaces comprises surface relief extraction features that are arranged to extract light from the light guided in the waveguide through the at least one of the front and rear light guiding surfaces; a light turning element arranged in front of the waveguide and comprising light turning surfaces arranged to receive the extracted light and redirect it towards the normal to the predetermined area; and a rear reflector extending across and separated from the rear light guiding surface, the rear reflector being arranged to reflect light incident thereon and redirect it through the waveguide.

An illumination output with a narrow cone angle may be provided. Advantageously the visual security level of a privacy display may be increased. High luminance uniformity may be provided in a thin structure that may be flexible. The illumination apparatus may provide directional illumination for display backlighting, for environmental lighting or other illumination purposes.

The light emitting diodes may be located in front of the waveguide and arranged to emit light rearwardly. Advantageously the visibility of hot spots around the light emitting diodes may be reduced.

The support substrate may be transparent to light from the light emitting diodes. Advantageously high output transmission may be achieved.

The light emitting diodes may be located behind the waveguide and arranged to emit light forwardly. Advantageously an opaque substrate may be provided with reduced cost. Output transmission may be increased and cost reduced.

The light input features may have a minimum pitch, and the light emitting diodes may have a maximum width that is at most 5% of the minimum pitch of the light input features, preferably at most 3% of the minimum pitch of the light input features and most preferably at most 2% of the minimum pitch of the light input features. Advantageously the number of light emitting diodes may be reduced and cost may be reduced.

The light emitting diodes may have a maximum width of at most 300 micrometers, preferably less than 200 micrometers and most preferably at most 100 micrometers. Advantageously the cost of the light emitting diodes may be reduced while achieving desirable display luminance.

The light input features may be apertures that extend entirely through the waveguide. The apertures may be parallel sided in at least one cross-sectional plane comprising the normal to the predetermined area. Advantageously the thickness of the waveguide may be reduced, high input efficiency may be obtained and high uniformity may be obtained.

The apertures may have a width at the end at which light enters from the light emitting diodes that is at most 500% of the width of the light emitting diodes, preferably at most 300% of the width of the light emitting diodes and most preferably at most 200% of the width of the light emitting diodes. Advantageously alignment of the light emitting diodes and apertures may be provided for different operating temperatures while achieving high light input efficiency.

A light scattering element may be arranged between the light emitting diodes and the waveguide. The light scattering element may comprise colour conversion material. The height of the light scattering element may be preferably greater than 15% of the thickness of the waveguide, more preferably greater than 30% of the thickness of the waveguide and most preferably greater than 50% of the thickness of the waveguide. The width of the light scattering element may be less than the width of the apertures. Advantageously light may be efficiently coupled into the waveguide, uniformity may be increased and visibility of hot spots reduced. A white light output may be achieved.

The light emitting diodes may be located behind the waveguide and arranged to emit light forwardly and the illumination apparatus may further comprise light shields arranged to prevent light exiting from the front of the apertures. Advantageously the visibility of hot spots near to the light emitting diodes may be reduced.

The light input features may be recesses extending part way though the waveguide. The recesses may be conical recesses. The conical recesses may have minimum surface normal tilt with respect to the normal to the predetermined area of at least 84 degrees, and preferably at least 86 degrees. Advantageously light shields may be omitted, reducing cost and complexity of assembly. The visibility of hot spots may be reduced or removed.

The surface relief extraction features may have a maximum surface normal tilt with respect to the normal to the predetermined area that is at most 10 degrees, preferably at most 7.5 degrees and most preferably at most 5 degrees. The surface relief extraction features may have a maximum surface normal tilt with respect to the normal to the predetermined area that is at least 1 degree, preferably at least 1.5 degrees and most preferably at least 2 degrees. Advantageously output illumination with a narrow cone angle may be provided.

The light output from the waveguide may be at an angle to the normal to the waveguide of at least 60 degrees. More than 50% of the light output from the waveguide may be at an angle to the normal to the waveguide of greater than 70 degrees. The direction of light output from the waveguide with maximum luminous intensity may be at an angle to the normal to the waveguide of greater than 70 degrees. Advantageously output illumination with a narrow cone angle may be provided.

The front light guiding surface may comprise surface relief extraction features. Advantageously output efficiency may be increased.

The rear light guiding surface may comprise surface relief extraction features. Advantageously wetting between the waveguide and the rear reflector may be reduced.

The light turning surfaces may be planar. Advantageously a narrow cone of illumination may be provided to achieve high visual security level in a privacy mode of operation.

The light turning surfaces may be arranged in pairs that are symmetric in a plane comprising the normal to the predetermined area. Advantageously angular uniformity may be increased.

The light turning surfaces may be arranged in a one-dimensional array. Advantageously the cost and complexity of tooling and replication may be reduced. A display may be provided that has a narrow range of viewing angles in a lateral direction and a wide range of viewing angles in an elevation direction. The display may be conveniently rotated to achieve comfortable viewing angle by a head-on user.

The light turning surfaces may be arranged in a two-dimensional array. The light turning surfaces may be surfaces of an array of prisms or an array of cones. Advantageously output efficiency may be increased. A display that provides privacy operation in both landscape and portrait orientations may be provided.

The light turning surfaces may have a surface normal tilt relative to the normal to the predetermined area of at least 62.5 degrees, preferably at least 65 degrees, and most preferably at least 66.5 degrees. The light turning surfaces may have a surface normal tilt relative to the normal to the predetermined area of at most 72.5 degrees, preferably at most 70 degrees and most preferably at most 68.5 degrees. The highest luminance may be provided in a head-on direction to advantageously achieve highest efficiency for a head-on user.

The light turning surfaces may be disposed on the rear side of the light turning element. Advantageously low light levels may be achieved at high viewing angles.

The rear reflector may be planar. Advantageously reflector cost and complexity may be reduced.

According to a second aspect of the present disclosure, there is provided a display apparatus comprising a transmissive spatial light modulator and an illumination apparatus according to any one of the preceding descriptions arranged to provide illumination to the transmissive spatial light modulator. Advantageously a backlight for a privacy display may be provided. The display may be a switchable privacy display with desirable off-axis illumination levels in public mode of operation and desirable off-axis illumination levels in a privacy mode of operation when a switchable polarisation control retarder is provided.

The display apparatus may further comprise a control system arranged to control the luminous flux of the light emitted from the light emitting diodes. The control may be in response to image data supplied to the transmissive spatial light modulator. Advantageously a high dynamic range display may be provided suitable for a privacy display.

Any of the aspects of the present disclosure may be applied in any combination.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
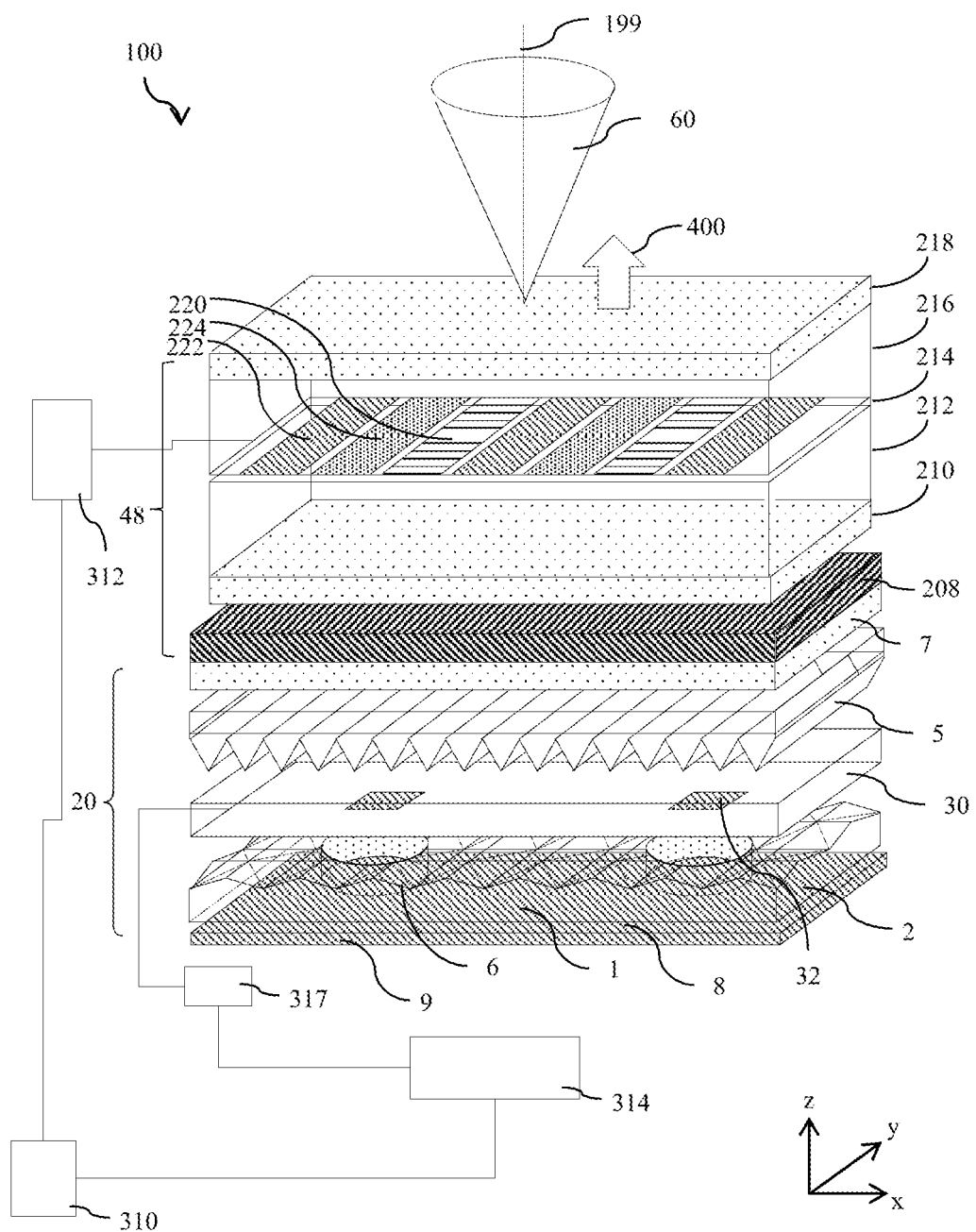
FIG. 1A is a schematic diagram illustrating in side perspective view an optical stack of a high efficiency and high dynamic range display device comprising an array backlight arranged to illuminate a spatial light modulator.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$VSL = (Y+R)/(Y-K) \qquad \text{eqn. 1}$$

where VSL is the visual security level, Y is the luminance of the white state of the display at a snooper viewing angle, K is the luminance of the black state of the display at the snooper viewing angle and R is the luminance of reflected light from the display.

Panel contrast ratio is given as:

$$C = Y/K \qquad \text{eqn. 2}$$

For high contrast optical LCD modes, the white state transmission remains substantially constant with viewing angle. In the contrast reducing liquid crystal modes of the present embodiments, white state transmission typically reduces as black state transmission increases such that $$Y+K \sim P \cdot L \qquad \text{eqn. 3}$$

The visual security level may then be further given as:

$$VSL = \frac{(C + I \cdot \rho/\pi \cdot (C+1)/(P \cdot L))}{(C-1)} \qquad \text{eqn. 4}$$

where off-axis relative luminance, P is typically defined as the percentage of head-on luminance, L at the snooper angle and the display may have image contrast ratio C and the surface reflectivity is ρ.

The off-axis relative luminance, P is sometimes referred to as the privacy level. However, such privacy level P describes relative luminance of a display at a given polar angle compared to head-on luminance, and is not a measure of privacy appearance.

The display may be illuminated by Lambertian ambient illuminance I. Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles, allowing the visual security level to be approximated to:

$$VSL = 1 + I \cdot \rho/(\pi \cdot P \cdot L) \qquad \text{eqn. 5}$$

The perceptual image security may be determined from the logarithmic response of the eye, such that $$S = \log_{10}(V) \qquad \text{eqn. 6}$$

Desirable limits for S were determined in the following manner. In a first step a privacy display device was provided. Measurements of the variation of privacy level, P(θ) of the display device with polar viewing angle and variation of reflectivity ρ(θ) of the display device with polar viewing angle were made using photopic measurement equipment. A light source such as a substantially uniform luminance light box was arranged to provide illumination from an illuminated region that was arranged to illuminate the privacy display device along an incident direction for reflection to viewer positions at a polar angle of greater than 0° to the normal to the display device. The variation I(θ) of illuminance of a substantially Lambertian emitting lightbox with polar viewing angle was determined by measuring the variation of recorded reflective luminance with polar viewing angle taking into account the variation of reflectivity ρ(θ). The measurements of P(θ), r(θ) and I(θ) were used to determine the variation of Security Factor S(θ) with polar viewing angle along the zero elevation axis.

In a second step a series of high contrast images were provided on the privacy display including (i) small text images with maximum font height 3 mm, (ii) large text images with maximum font height 30 mm and (iii) moving images.

In a third step each observer (with eyesight correction for viewing at 1000 mm where appropriate) viewed each of the images from a distance of 1000 m, and adjusted their polar angle of viewing at zero elevation until image invisibility was achieved for one eye from a position near on the display at or close to the centre-line of the display. The polar location of the observer's eye was recorded. From the relationship S(θ), the security factor at said polar location was determined. The measurement was repeated for the different images, for various display luminance $Y_{max}$, different lightbox illuminance I(q=0), for different background lighting conditions and for different observers.

From the above measurements S<1.0 provides low or no visual security, 1.0≤S<1.5 provides visual security that is dependent on the contrast, spatial frequency and temporal frequency of image content, 1.5≤S<1.8 provides acceptable image invisibility (that is no image contrast is observable) for most images and most observers and S≥1.8 provides full image invisibility, independent of image content for all observers.

In comparison to privacy displays, desirably wide-angle displays are easily observed in standard ambient illuminance conditions. One measure of image visibility is given by the contrast sensitivity such as the Michelson contrast which is given by:

$$M = (I_{max} - I_{min})/(I_{max} + I_{min}) \qquad \text{eqn. 7}$$

and so:

$$M = ((Y+R) - (K+R))/((Y+R)+(K+R)) = (Y-K)/(Y+K+2 \cdot R) \qquad \text{eqn. 8}$$

Thus the visual security level (VSL), is equivalent (but not identical to) 1/M. In the present discussion, for a given off-axis relative luminance, P the wide-angle image visibility, W is approximated as $$W = 1/VSL = 1/(1 + I \cdot \rho/(\pi \cdot P \cdot L)) \qquad \text{eqn. 9}$$

In the present discussion the colour variation Δε of an output colour $(u_w'+\Delta u', v_w'+\Delta v')$ from a desirable white point $(u_w', v_w')$ may be determined by the CIELUV colour difference metric, assuming a typical display spectral illuminant and is given by:

$$\Delta \varepsilon = (\Delta u'^2 + \Delta v'^2)^{1/2} \qquad \text{eqn. 10}$$

Catadioptric elements employ both refraction and reflection, which may be total internal reflection or reflection from metallised surfaces.

The structure and operation of various directional display devices will now be described. In this description, common elements have common reference numerals. It is noted that the disclosure relating to any element applies to each device in which the same or corresponding element is provided. Accordingly, for brevity such disclosure is not repeated.

It would be desirable to provide a display with a high efficiency for head-on display users while achieving high dynamic range to increase image contrast.

Figure 1B:
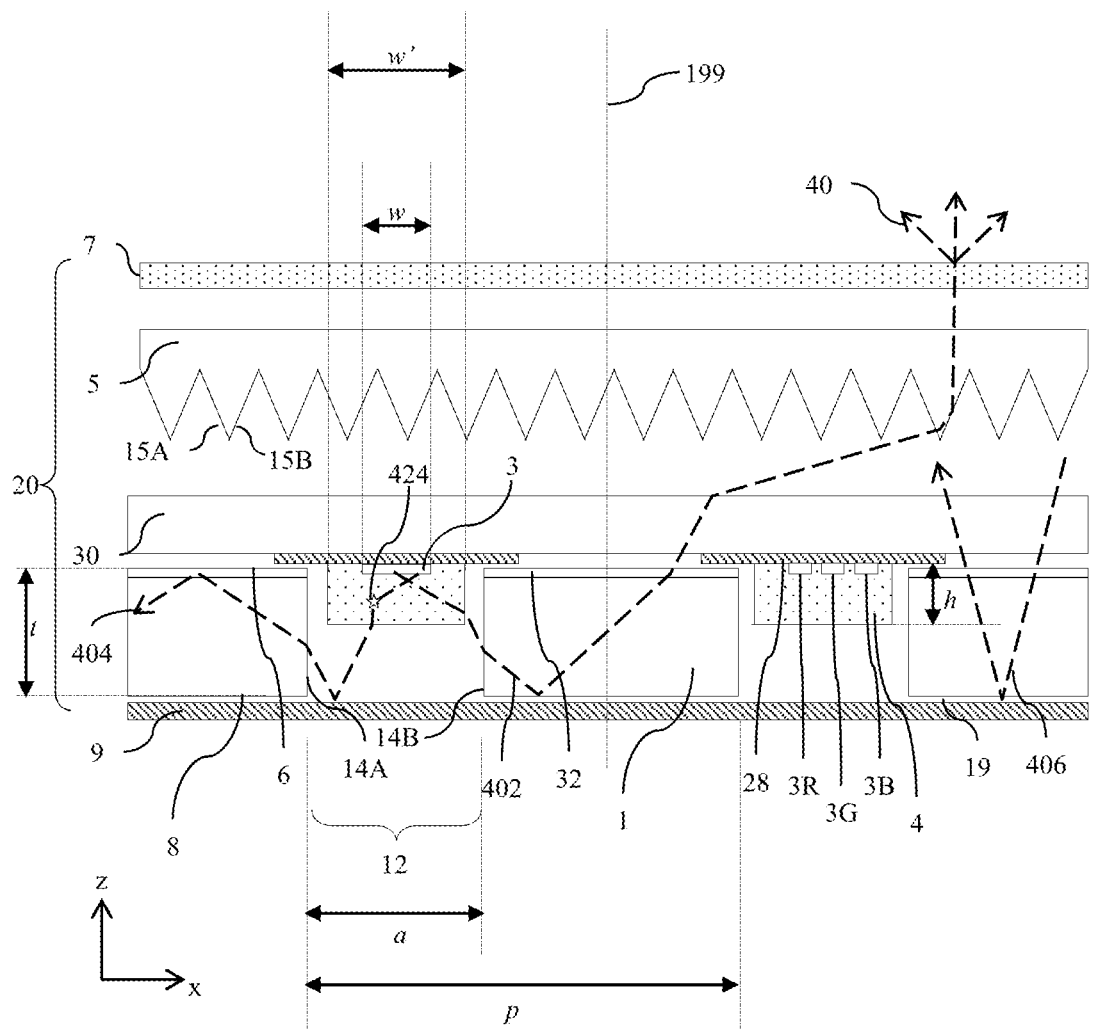
FIG. 1B is a schematic diagram illustrating in side view an optical stack of the backlight of FIG. 1A.

FIG. 1A is a schematic diagram illustrating cross-sectional perspective view an optical stack of a high efficiency and high dynamic range display device 100 comprising an array backlight 20 arranged to illuminate a spatial light modulator 48; and FIG. 1B is a schematic diagram illustrating cross-sectional view an optical stack of the backlight 20 of FIG. 1A.

Display apparatus 100 comprises transmissive spatial light modulator 48 and an illumination apparatus comprising backlight 20 arranged to provide illumination to the transmissive spatial light modulator 48. An illumination apparatus comprising backlight 20 is arranged for providing illumination 400 over a predetermined area. The predetermined area in FIG. 1A is at least the active area of the spatial light modulator 48 and is typically oversized in comparison to the active area to advantageously provide uniform illumination for off-axis viewing positions.

Spatial light modulator 48 comprises input polariser 210; TFT substrate 212; liquid crystal layer 214 that is pixelated with typically red pixels 220, green pixels 222 and blue pixels 224; colour filter substrate 216 and output polariser 218.

A control system comprises display controller 310, backlight controller 314, and LED array driver 317 arranged to control the luminous flux from the array of LEDs 3; and SLM controller 312 arranged to control the pixels 220, 222, 224 of the spatial light modulator 48. Controller 314 may be provided with image data so that the LEDs 3 of the LED array are controlled with image information. Control system 310, 314, 317, 312 is arranged to control the luminous flux of the light emitted from the light emitting diodes 3 wherein the control is in response to image data supplied to the transmissive spatial light modulator 48.

Advantageously high dynamic range images may be provided. For example, in regions of the image on the spatial light modulator 48 where black pixels are provided, the luminous flux from the LEDs 3 of the LED array may be reduced and increased image contrast achieved. Further display efficiency is increased. Highlight regions of the image may be provided with increased luminance to achieve further enhanced dynamic range.

The illumination apparatus comprises: a two-dimensional array of light emitting diodes 3 disposed on a support substrate 30, the light emitting diodes 3, (or LEDs 3), being arrayed across the predetermined area.

Waveguide 1 comprises: an array of light input features 12, each light input feature 12 being aligned to at least one light emitting diode 3 of the array of light emitting diodes 3, the light input features 12 being arranged to input light such as light ray 402 from the at least one aligned light emitting diode 3 into the waveguide 1. Front and rear light guiding surfaces 6, 8 extend across said predetermined area of the waveguide 1 and are arranged to guide light rays 402 received from the array of light emitting diodes 3 along the optical waveguide 1 by total internal reflection.

The front light guiding surface 6 comprises surface relief extraction features 32 that are arranged to extract light from the light 402 guided in the waveguide 1 through the at least one of the front and rear light guiding surfaces 6, 8.

As will be described further below, the light output from the features 32 is near to grazing incidence from the waveguide and typically around 75 degrees from the normal 199.

It is desirable to output light 400 in the light cone 60 from the spatial light modulator 48 in a direction close to the normal 199 to the predetermined area direction. The light cone 60 represents the FWHM profile of the output light 400 for example.

Light turning element 5 is arranged in front of the waveguide 1 and comprises light turning surfaces 15A, 15B arranged to receive the extracted light ray 402 and redirect it towards the normal 199 to the predetermined area.

Optional reflective recirculation polariser 208 is provided to recirculate polarised light within the backlight 20. Further half wave retarders (not shown) may be arranged between the reflective polariser 208 and the light turning element 5 to increase the luminance of recirculated light using internal reflections from the facets of the light turning element 5 and planar rear reflector 9.

Rear reflector 9 extends across and is separated from the rear light guiding surface 8 by air gap 19, the rear reflector 9 being arranged to reflect light ray 404 incident thereon and redirect it through the waveguide 1. Other light rays 406 are further directed through the waveguide by the rear reflector 9.

In the embodiment of FIGS. 1A-B the light emitting diodes 3 are located in front of the waveguide 1 and arranged to emit light such as light rays 402, 404 rearwardly. Input light rays pass into the waveguide 1 and are reflected by at least rear light guiding surface 8 before they are coupled out. Light extraction near the light emitting diode 3 is reduced and advantageously hot spots are reduced. LEDs 3 may have increased separation and reduced number while achieving desirable uniformity. Advantageously cost is reduced.

The support substrate 30 is transparent to light rays 402, 404 from the light emitting diodes 3. Light rays that are extracted by the waveguide are extracted through the substrate 30 or are reflected and recirculated by the rear reflector 9. High efficiency output may be achieved.

The light input features 12 have a minimum pitch p, and the light emitting diodes 3 have a maximum width w that is at most 5% of the minimum pitch p of the light input features 12, preferably at most 3% of the minimum pitch p of the light input features 12 and most preferably at most 2% of the minimum pitch p of the light input features 12. Advantageously the LEDs may be widely separated, and reduced number while achieving high uniformity and low cost. Light loss and hot spots may be reduced in the regions near to the light input features 12.

The light emitting diodes 3 have a maximum width w of at most 300 micrometers, preferably less than 200 micrometers and most preferably at most 100 micrometers. Advantageously the total area of semiconductor material may be reduced, achieving reduced cost.

The light emitting diodes 3 are each provided in a light scattering element 4. Colour conversion material and/or a light scattering material may be arranged in the light scattering element 4 to receive light from the light emitting diodes 3, for example to convert blue output from GaN LEDs to white light or to scatter blue light. The light scattering element may further comprise a transparent material. The colour conversion material may be a phosphor material or quantum dot material.

The width w' of the light scattering element 4 is greater than or the same as the width w of the light emitting diodes 3 and less than the width a of the apertures 12. The height h of the light scattering element is preferably greater than 15% of the thickness t of the waveguide 1, more preferably greater than 30% of the thickness of the waveguide 1 and most preferably greater than 50% of the thickness of the waveguide 1. Light scattering and/or colour conversion regions 424 within the light scattering element achieves increased filling of optical modes within the waveguide 1. Advantageously uniformity of illumination is increased and hot spot visibility is reduced.

The colour conversion material may be coated in a thin layer on the light emitting diodes. The light emitting diodes may have different coloured output 3R, 3G, 3B and the light scattering element may comprise light scattering material only or may be omitted.

In the embodiment of FIGS. 1A-B the light input features 12 are apertures that extend entirely through the waveguide 1 and have sides 14A, 14B in at least one cross-sectional plane that comprises the normal 199 to the predetermined area. The apertures have a width a at the end at which light enters from the light emitting diodes that is at most 500% of the width (or diameter), w of the light emitting diodes 3, preferably at most 300% of the width, w of the light emitting diodes 3 and most preferably at most 200% of the width, w of the light emitting diodes 3.

The front light guiding surface 6 comprises surface relief extraction features as will be further described with reference to FIGS. 3A-B below.

It may be desirable to provide a collimated illumination apparatus for environmental or other illumination purposes to achieve high illuminance and low glare.

Figure 2:
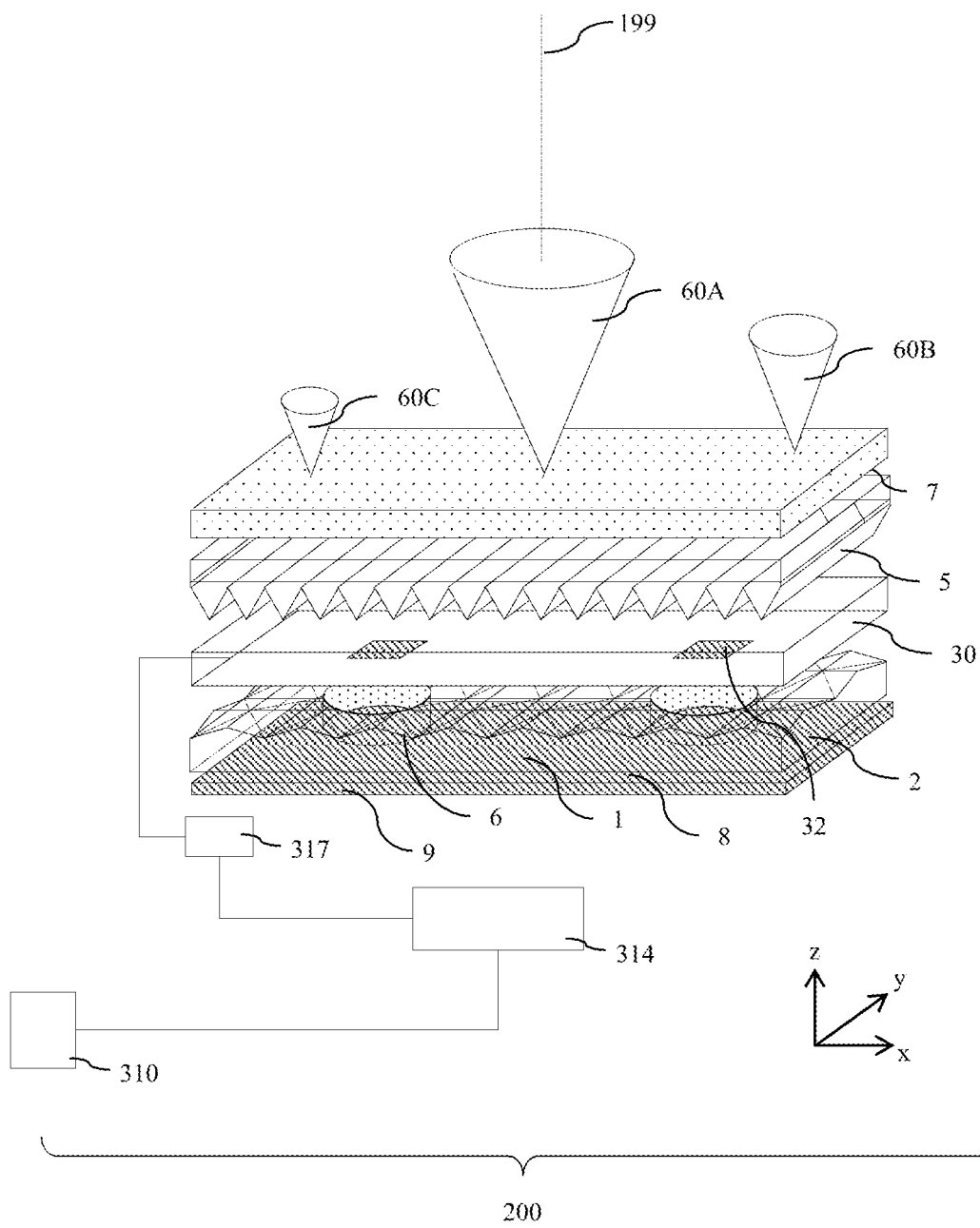
FIG. 2 is a schematic diagram illustrating in side perspective view an optical stack of a high efficiency and high dynamic range environmental lighting device comprising an array of light emitting diodes arranged to illuminate an ambient environment.

FIG. 2 is a schematic diagram illustrating in side perspective view an optical stack of a high efficiency and spatially controllable environmental lighting device comprising an array of light emitting diodes arranged to illuminate an ambient environment. The light output may be controlled to provide spatially patterned illumination light cones 60A, 60B, 60C across the predetermined area of the illumination apparatus. High spatial uniformity of illumination may be achieved into a narrow cone angle as will be described further hereinbelow.

Advantageously an illumination apparatus may provide sunlight type illumination from a large area light source with high uniformity. The luminance of the illumination apparatus is reduced in comparison to small area collimated sources. Image glare may be reduced and high efficiency achieved.

Further the profile of the illumination may be varied to achieve light dappling simulation by providing image data to the illumination apparatus by means of controllers 310, 314, 317 and omitting spatial light modulator 48. Desirable lighting characteristics for indoors operation may be achieved to simulate an outdoors environment.

Features of the arrangement of FIG. 2 not discussed in further detail may be assumed to correspond to the features with equivalent reference numerals as discussed above, including any potential variations in the features.

The structure of optical waveguide 1 will now be further described.

Figure 3A:
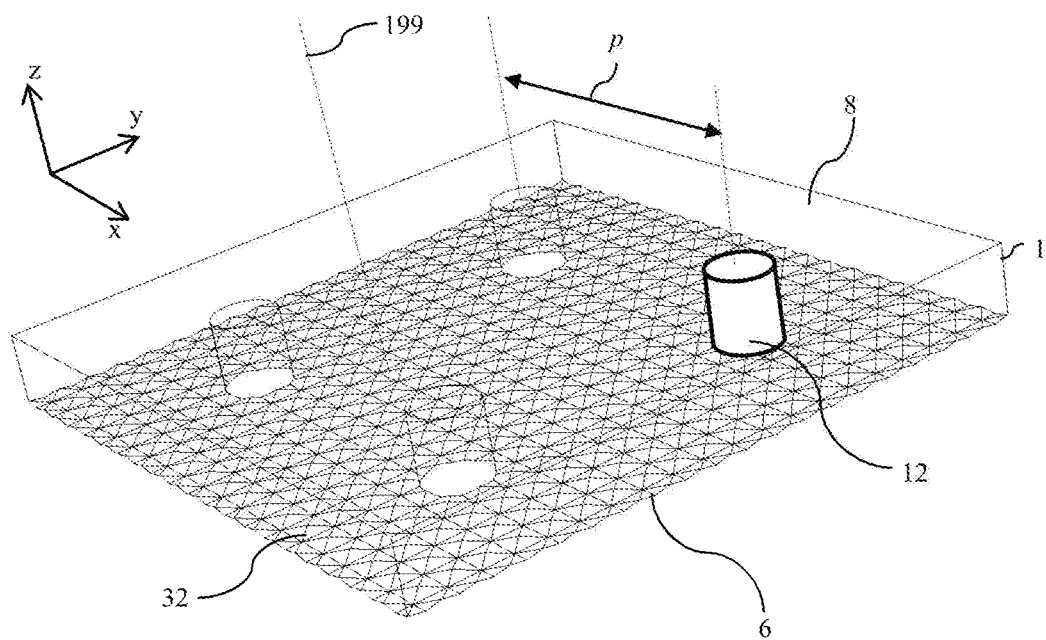
FIG. 3A is a schematic diagram illustrating cross-sectional perspective view a waveguide for use in the optical stack of the backlight of FIG. 1A.
Figure 3B:
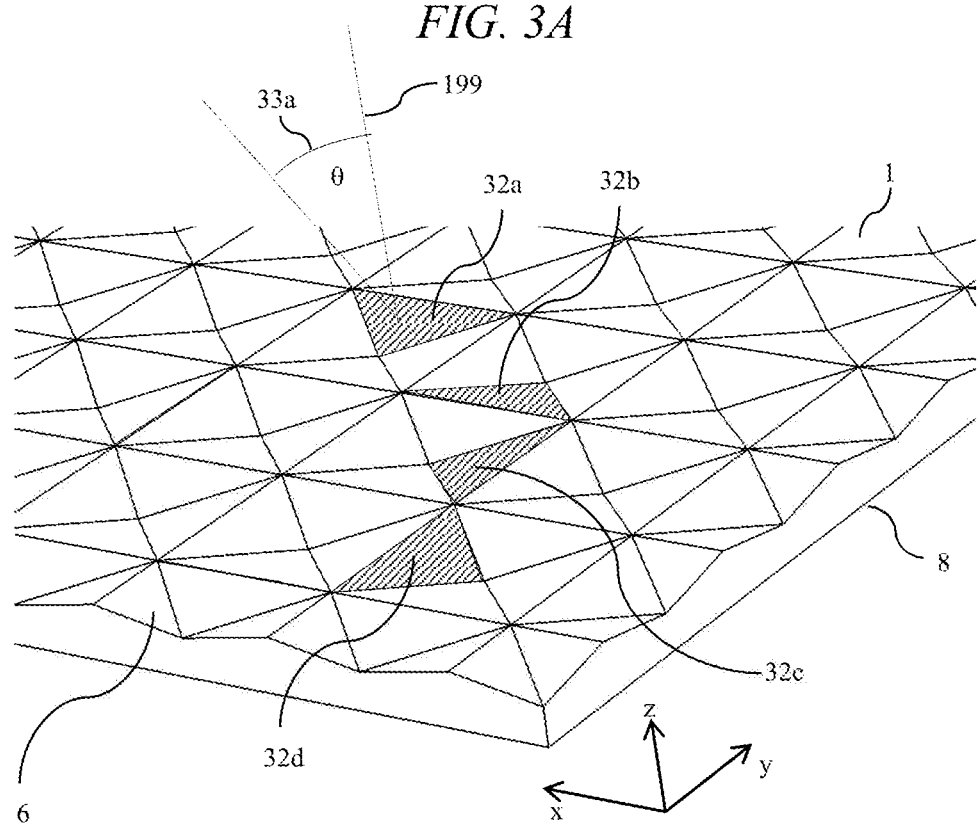
FIG. 3B is a schematic diagram illustrating in side perspective view the surface structure of the waveguide of FIG. 3A.

FIG. 3A is a schematic diagram illustrating in side perspective view a waveguide 1 for use in the optical stack of the backlight 20 of FIG. 1A; and FIG. 3B is a schematic diagram illustrating in side perspective view the surface structure of the waveguide 1 of FIG. 3A. Features of the arrangements of FIGS. 3A-B not discussed in further detail may be assumed to correspond to the features with equivalent reference numerals as discussed above, including any potential variations in the features.

Planar surface relief light extraction features 32a-d are arranged with surface normal that are tilted with respect to the normal 199 to the predetermined area about respective different planes x-z and y-z. Advantageously light extraction directions for rays 402 in FIG. 1B may be achieved that are in two dimensions and some output symmetry is obtained in polar space.

The surface relief extraction features 32 have a maximum surface normal tilt 33 with respect to the normal 199 to the predetermined area (with exemplary angle 33a illustrated) that is at most 10 degrees, preferably at most 7.5 degrees and most preferably at most 5 degrees. The surface relief extraction features 32 have a maximum surface normal tilt 33 with respect to the normal 199 to the predetermined area that is at least 1 degree, preferably at least 1.5 degrees and most preferably at least 2 degrees. Advantageously efficient light extraction may be achieved.

The light output from the waveguide may be at an angle to the normal to the waveguide of at least 60 degrees. More than 50% of the light output from the waveguide may be at an angle to the normal to the waveguide of greater than 70 degrees. The direction of light output from the waveguide with maximum luminous intensity may be at an angle to the normal to the waveguide of greater than 70 degrees. Advantageously output illumination with a narrow cone angle may be provided.

The structure of a light turning film 5 will now be further described.

Figure 4:
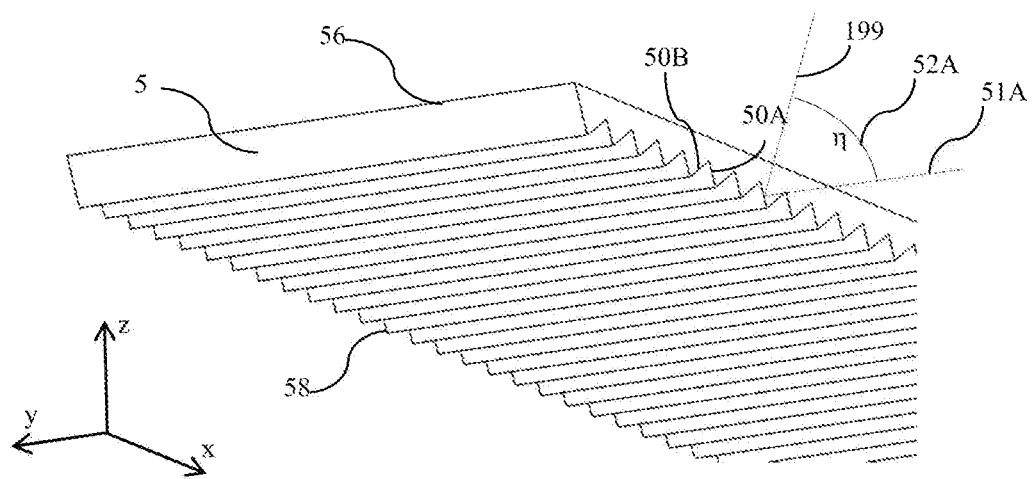
FIG. 4 is a schematic diagram illustrating in side perspective view a one dimensional light turning element of the optical stack of the backlight of FIG. 1A.

FIG. 4 is a schematic diagram illustrating in side perspective view a one dimensional light turning element 5 of the optical stack of the backlight 20 of FIGS. 1A-B. Light turning element 5 comprises light turning surfaces 50A, 50B that are planar and arranged in pairs that are symmetric in a plane comprising the normal 199 to the predetermined area. In other embodiments (not illustrated), asymmetric pairs may be provided to provide some asymmetry of output luminance profile. Features of the arrangement of FIG. 4 not discussed in further detail may be assumed to correspond to the features with equivalent reference numerals as discussed above, including any potential variations in the features.

The light turning surfaces 50A-B are arranged in a one-dimensional array. Advantageously such elements are conveniently tooled and replicated at low cost with high yield.

The light turning surfaces 50A, 50B have a surface normal 51A, 51B tilts 52A, 52B relative to the normal 199 to the predetermined area of at least 62.5 degrees, preferably at least 65 degrees, and most preferably at least 66.5 degrees.

The light turning surfaces 50A, 50B have a surface normal 51A, 51B tilts 52A, 52B relative to the normal 199 to the predetermined area of at most 72.5 degrees, preferably at most 70 degrees and most preferably at most 68.5 degrees.

The light turning surfaces 50A, 50B are disposed on the rear side 58 of the light turning element 5. The front side 56 may be planar or may comprise a diffusing surface.

Returning to the description of FIG. 1B, the light turning element 5 redirects light from the waveguide to a direction along the normal 199 to the predetermined area by means of refraction and total internal reflection at the light turning surfaces 50A, 50B. Advantageously the output from the illumination apparatus has high efficiency and an on-axis direction.

Further some light rays 402 are directed from regions between the light blocking region and the spatial light modulator 48. Advantageously spatial uniformity is increased while maintaining desirable polar luminance profile as will be further described below.

Figure 5:
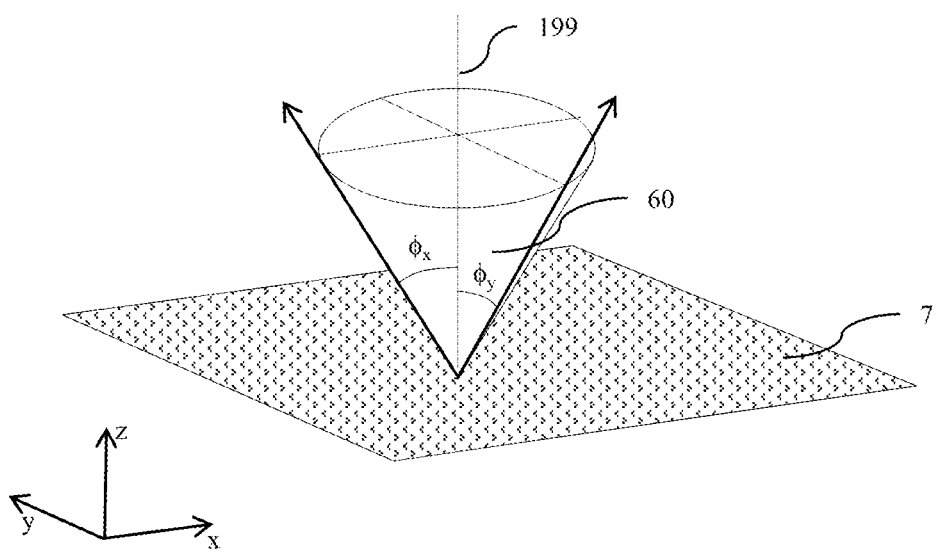
FIG. 5 is a schematic diagram illustrating in side perspective view a symmetric diffuser of the optical stack of the backlight of FIG. 1A.

FIG. 5 is a schematic diagram illustrating in side perspective view a symmetric diffuser of the optical stack of the backlight of FIG. 1A. A bulk diffusing layer and/or a surface diffusing layer is arranged to redirect a collimated input light ray to light cone 62. The output light cones 60 from the illumination apparatus 20 are determined by the combination of the light cone output from the light turning element 5 and the diffuser light cone 62. In a symmetric diffuser, the angles $\phi_x$, $\phi_y$ are equal, wherein the angles $\phi_x$, $\phi_y$ represent the angle of the half luminance compared to the luminance along the normal 199 to the predetermined area. In the present disclosure a Lambertian diffuser is a diffuser that provides equal luminance for all angles in a given axis.

An illustrative embodiment will now be described with reference to the structure of the above figures and the optical properties described in TABLE 1A and FIGS. 6A-C.

TABLE 1A

| Item | Property | Value |
|---|---|---|
| Light emitting diode 3 | Width, w (mm) | 0.1 |
|  | Colour conversion material 4 height (mm) | 0.1 |
| Reflective light blocking element 28 | Diameter (mm) | 0.2 |
| Transparent support substrate 30 | Thickness(mm) | 0.25 |
| Waveguide 1 | Thickness t (mm) | 0.5 |
|  | Refractive index | 1.5 |
| Aperture 12 | Diameter a (mm) | 0.2 |
|  | Pitch, p (mm) | 10 |
| Light extraction feature 32 | Shape | Square based pyramid |
|  | Tilt 33 (°) | 3 |
|  | Pitch (mm) | 0.2 |
| Light turning element 5 | Light turning surface 50 profile | Elongate along y axis |
|  | Light turning surface 50 Surface normal 51 tilt 52 | 67.5 |
|  | Pitch (mm) | 0.2 |
| Diffuser 7 (weak symmetric) | Angle $\phi_x$ (°) | 10 |
|  | Angle $\phi_y$ (°) | 10 |
| Diffuser 7 (strong symmetric) | Angle $\phi_x$ | Lambertian |
|  | Angle $\phi_y$ | Lambertian |
| Diffuser 7 (asymmetric) | Angle $\phi_x$ (°) | 10 |
|  | Angle $\phi_y$ | Lambertian |

TABLE 1B illustrates desirable ranges for items of present embodiments.

TABLE 1B

| | | Desirable range | | |
|---|---|---|---|---|
| Item | Property | Preferable | More preferable | Most preferable |
| Light emitting diode 3 | Width, w (mm) | ≤0.3 | ≤0.2 | ≤0.1 |
|  | Light scattering element 4 height, h (mm) | ≥0.15t | ≥0.3t | ≥0.5t |
| Aperture 12 | Diameter a (mm) | ≥5w | ≥3w | ≥0.5w |
|  | Pitch, p (mm) | ≥20w | ≥33.3w | ≥50w |
| Light extraction feature 32 | Tilt θ (°) | 1.0 ≤ θ ≤ 10 | 1.5 ≤ θ ≤ 7.5 | 2.0 ≤ θ ≤ 5.0 |
| Light turning element 5 | Light turning surface 50 Surface normal 51 tilt η (°) | 62.5 ≤ η ≤72.5 | 65.0 ≤ η ≤ 70.0 | 66.5 ≤ η ≤ 68.5 |

Figure 6A:
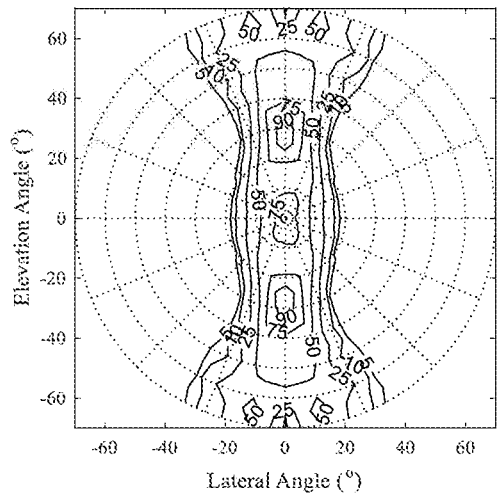
FIG. 6A is a schematic graph of the polar output distribution of the arrangement of FIG. 1A with no output diffuser and the light turning element of FIG. 4.

FIG. 6A is a schematic graph of the polar output distribution of the arrangement of FIG. 1A with no output diffuser and the light turning element of FIG. 4; FIG. 6B is a schematic graph of the spatial distribution of uniformity of light output in a direction along the normal to the predetermined area of the arrangement of FIG. 1A with a weak symmetric diffuser and the light turning element of FIG. 4; and FIG. 6C is a schematic graph of the spatial distribution of uniformity of light output in a direction along the normal to the predetermined area of the arrangement of FIG. 1A with a strong symmetric diffuser and the light turning element of FIG. 4.

Advantageously an angular luminance profile is provided that has limited extent in the lateral direction (parallel to the x-axis). Such a profile has higher efficiency for on-axis illumination in comparison to Lambertian or other wide angle outputs.

Figure 6B:
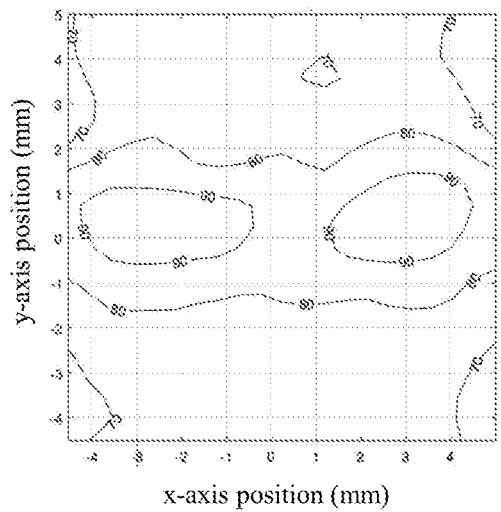
FIG. 6B is a schematic graph of the spatial distribution of uniformity of light output in a direction along the normal to the predetermined area of the arrangement of FIG. 1A with a weak symmetric diffuser and the light turning element of FIG. 4.
Figure 6C:
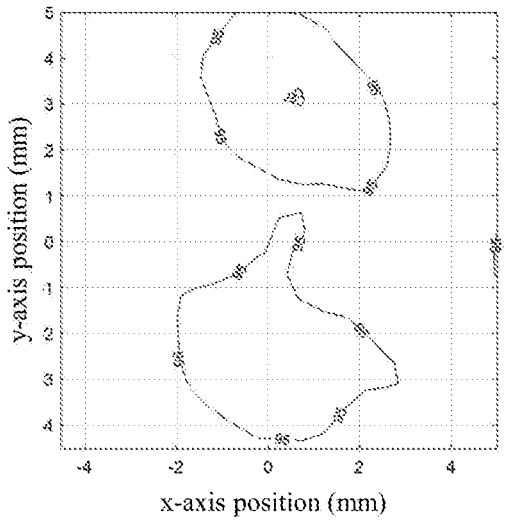
FIG. 6C is a schematic graph of the spatial distribution of uniformity of light output in a direction along the normal to the predetermined area of the arrangement of FIG. 1A with a strong symmetric diffuser and the light turning element of FIG. 4.

Further desirable uniformity may be achieved by means of adjusting diffuser 7 profile as illustrated in FIG. 6C.

Such displays are suitable for use with privacy display control elements as will be described with reference to FIG. 20, below.

It would be desirable to reduce the spatial non-uniformities in the y-axis direction of FIGS. 6B-C.

Figure 7:
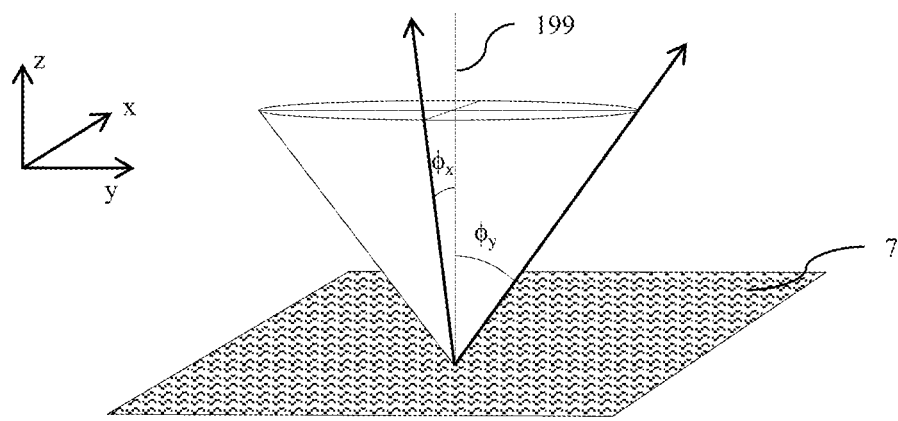
FIG. 7 is a schematic diagram illustrating in side perspective view an asymmetric diffuser.
Figure 8:
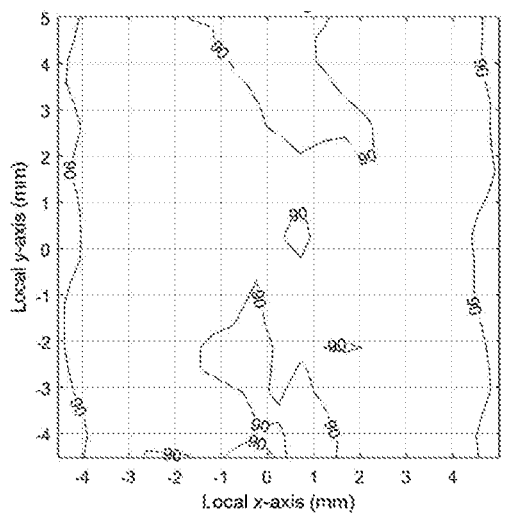
FIG. 8 is a schematic graph of the spatial distribution of uniformity of light output in a direction along the normal to the predetermined area of the arrangement of FIG. 1A with an asymmetric diffuser.

FIG. 7 is a schematic diagram illustrating in side perspective view an asymmetric diffuser; and FIG. 8 is a schematic graph of the spatial distribution of uniformity of light output in a direction along the normal to the predetermined area of the arrangement of FIG. 1A with an asymmetric diffuser similar to that illustrated in FIG. 7 and described in TABLE 1A.

Advantageously spatial non-uniformities may be reduced.

It would be desirable to further increase the head-on display efficiency.

Figure 9:
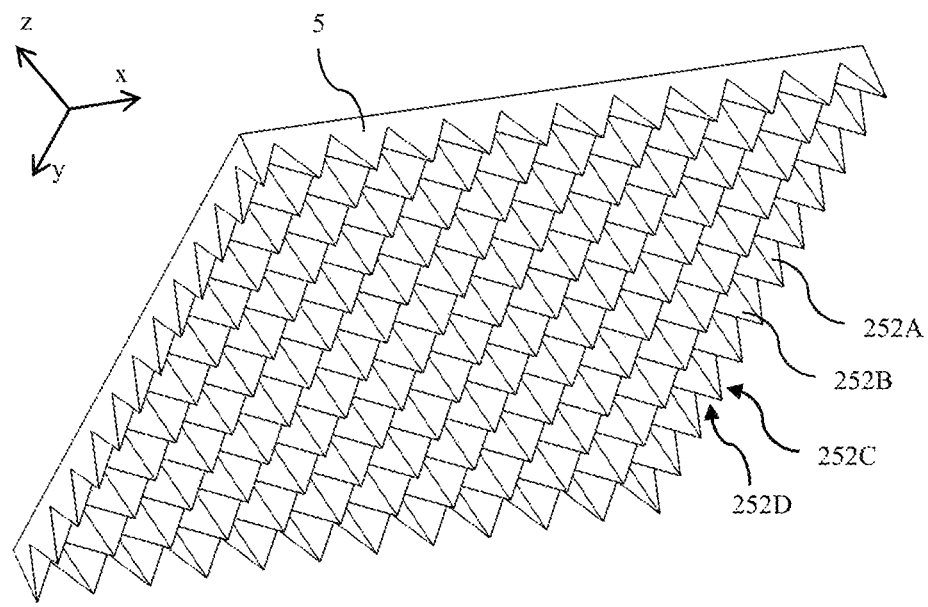
FIG. 9 is a schematic diagram illustrating in side perspective view a two dimensional cross-cut light turning element.

FIG. 9 is a schematic diagram illustrating in side perspective view a two dimensional cross-cut light turning element 5. The light turning surfaces 252A-D are arranged in a two-dimensional array and the light turning surfaces are surfaces of an array of prisms.

In comparison to the light turning element of FIG. 4, the light turning surfaces 252A-D are arranged in a two-dimensional array and are an array of prisms with planar sides, that is they are square based pyramids.

An illustrative embodiment will now be described with reference to the structure of the above figures and the optical properties described in TABLE 1A modified by the light turning element of TABLE 2 and FIGS. 10A-C.

TABLE 2

| Item | Property | Illustrative example |
|---|---|---|
| Light turning element 5 | Light turning surface 502 profile | Square based pyramid |
|  | Light turning surface 502 Surface normal tilt | 67.5° |
|  | Pitch | 0.17 mm |

Figure 10A:
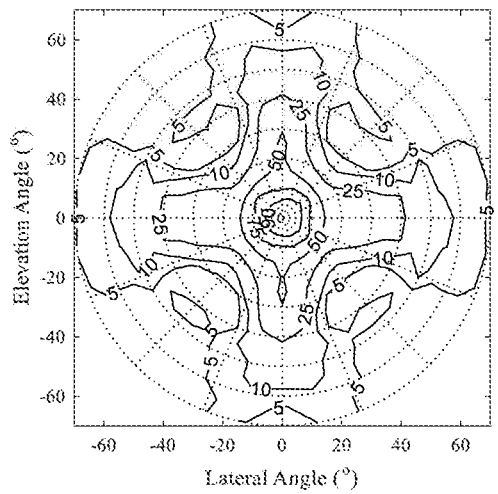
FIG. 10A is a schematic graph of the polar output distribution of the arrangement of FIG. 1A with no output diffuser and the light turning element of FIG. 9.
Figure 10B:
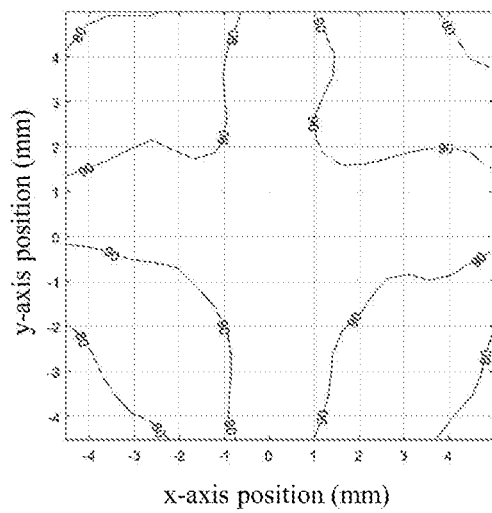
FIG. 10B is a schematic graph of the spatial distribution of uniformity of light output in a direction along the normal to the predetermined area of the arrangement of FIG. 1A with a weak symmetric diffuser and the light turning element of FIG. 9.
Figure 10C:
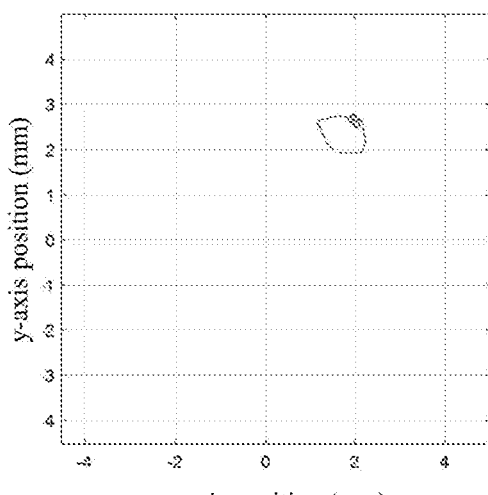
FIG. 10C is a schematic graph of the spatial distribution of uniformity of light output in a direction along the normal to the predetermined area of the arrangement of FIG. 1A with a strong symmetric diffuser and the light turning element of FIG. 9.

FIG. 10A is a schematic graph of the polar output distribution of the arrangement of FIG. 1A with no output diffuser and the light turning element of FIG. 9; FIG. 10B is a schematic graph of the spatial distribution of uniformity of light output in a direction along the normal to the predetermined area of the arrangement of FIG. 1A with a weak symmetric diffuser and the light turning element of FIG. 9; and FIG. 10C is a schematic graph of the spatial distribution of uniformity of light output in a direction along the normal to the predetermined area of the arrangement of FIG. 1A with a strong symmetric diffuser and the light turning element of FIG. 9.

Advantageously the azimuthal uniformity of output is increased. Higher on-axis efficiency is provided in comparison to the output of FIG. 6A. Such a backlight 20 is further suitable for use with mobile displays that are used in both landscape and portrait modes of operation.

It may be desirable to provide increased symmetry of polar luminance profile.

Figure 11:
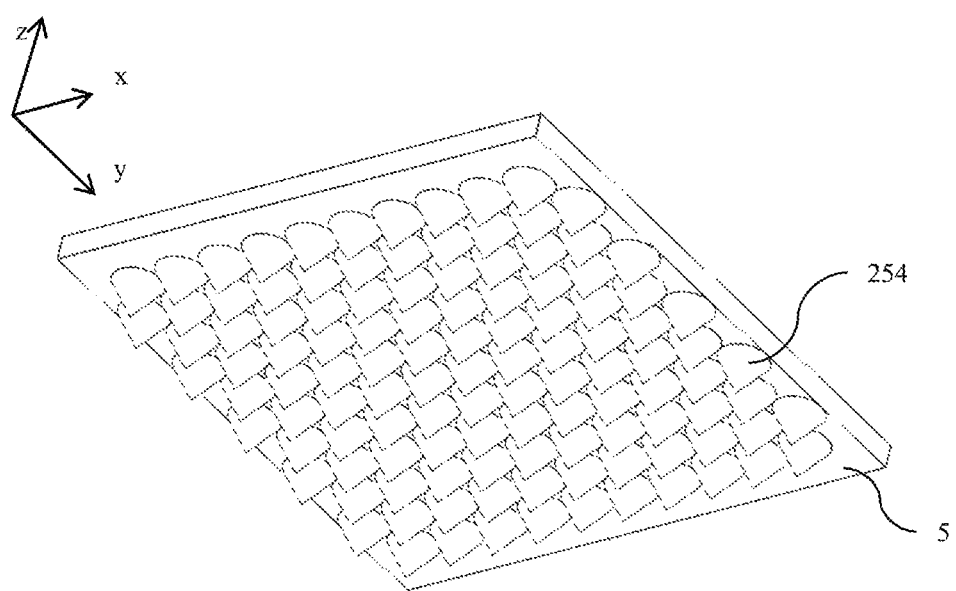
FIG. 11 is a schematic diagram illustrating in side perspective view a two dimensional light turning element comprising an array of conical light turning features.

FIG. 11 is a schematic diagram illustrating in side perspective view a two dimensional light turning element comprising an array of conical light turning features. The light turning surfaces 254 are arranged in a two-dimensional array and the light turning surfaces 254 are surfaces of an array of cones.

An illustrative embodiment will now be described with reference to the structure of the above figures and the optical properties described in TABLE 1A modified by the light turning element of TABLE 3 and FIGS. 12A-C.

TABLE 3

| Item | Property | Illustrative example |
|---|---|---|
| Light turning element 5 | Light turning surface 50 profile | 2D array of cones |
| | Light turning surface 50 Surface normal 51 tilt 52 | 67.5° |
| | Pitch | 0.2 mm |

Figure 12A:
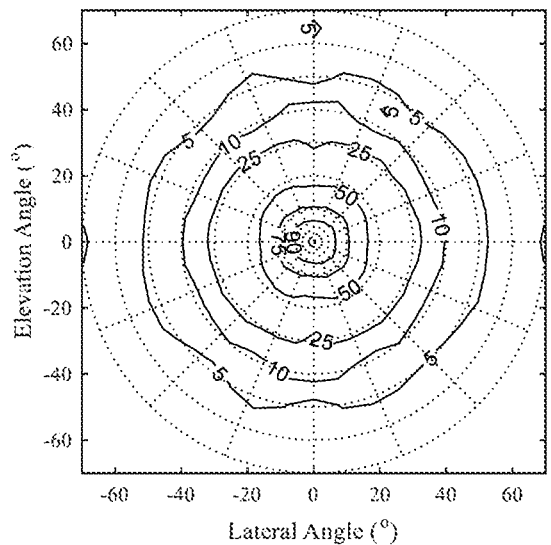
FIG. 12A is a schematic graph of the polar output distribution of the arrangement of FIG. 1A with no output diffuser and the light turning element of FIG. 11.
Figure 12B:
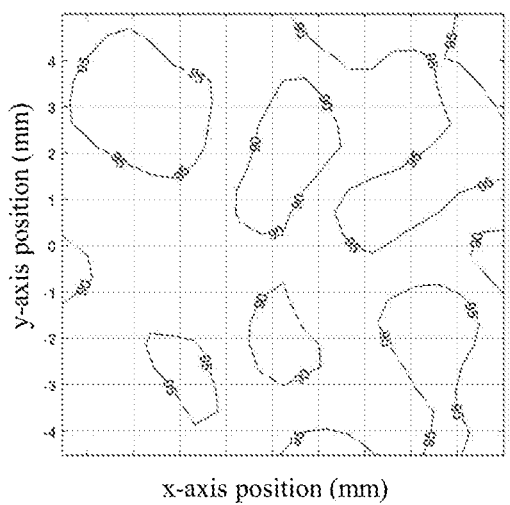
FIG. 12B is a schematic graph of the spatial distribution of uniformity of light output in a direction along the normal to the predetermined area of the arrangement of FIG. 1A with a weak symmetric diffuser and the light turning element of FIG. 11.
Figure 12C:
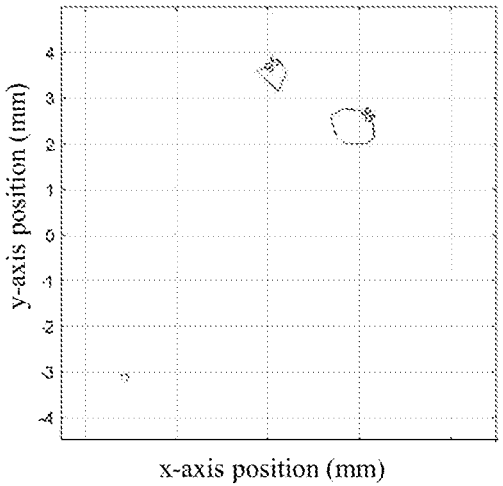
FIG. 12C is a schematic graph of the spatial distribution of uniformity of light output in a direction along the normal to the predetermined area of the arrangement of FIG. 1A with a strong symmetric diffuser and the light turning element of FIG. 11.

FIG. 12A is a schematic graph of the polar output distribution of the arrangement of FIG. 1A with no output diffuser and the light turning element of FIG. 11; FIG. 12B is a schematic graph of the spatial distribution of uniformity of light output in a direction along the normal to the predetermined area of the arrangement of FIG. 1A with a weak symmetric diffuser and the light turning element of FIG. 11; and FIG. 12C is a schematic graph of the spatial distribution of uniformity of light output in a direction along the normal to the predetermined area of the arrangement of FIG. 1A with a strong symmetric diffuser and the light turning element of FIG. 11.

The structure of the transparent light emitting diode support substrate 30 will now be further described.

Figure 13A:
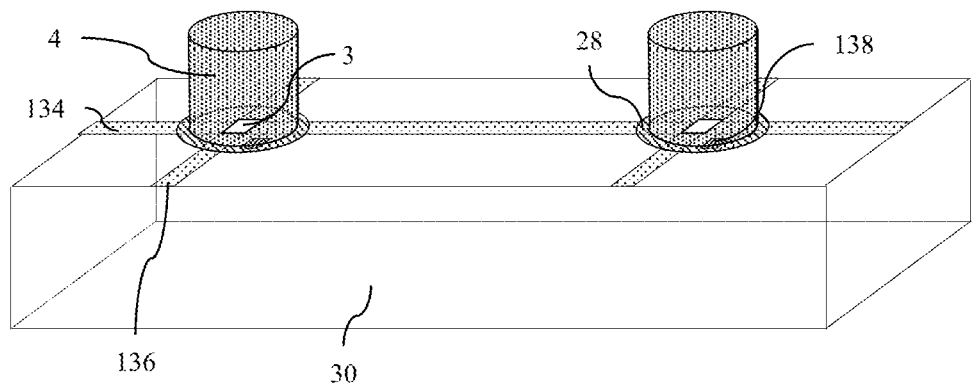
FIG. 13A is a schematic diagram illustrating in side perspective view an array of LEDs arranged on a transparent substrate.

FIG. 13A is a schematic diagram illustrating in side perspective view an array of LEDs 3 arranged on the transparent substrate 30. Electrodes 134, 136 may be arranged to provide drive signals to the LEDs 3 and may be driven by driver 317. The electrodes 134, 136 may be transparent electrodes to advantageously achieve increased light efficiency. The light blocking element 28 may be an electrode. Further the light blocking element 28 may be reflective to increase light output efficiency from the LED 3.

The LEDs 3 may have an output that is controlled in response to image data as described with reference to FIG. 1A. Further control circuitry 138 may be provided such as thin film transistors to achieve control of LEDs or groups of LEDs. Advantageously high dynamic range operation may be achieved. Power consumption may be reduced.

The substrate 30 may for example comprise a glass material. High temperature processing may be provided for the electrodes 134, 136 and control circuitry 138.

The LEDs may have colour conversion material 4 formed as a column over the LEDs 3. Light from the LEDs 3 may be scattered by the colour conversion material 4 and input sideways into the waveguide 1. Advantageously efficiency may be increased. The height of the column of material 4 in a direction normal 199 to the predetermined direction may be adjusted to achieve control of colour from the respective LED 3 across the array of LEDs 3.

Features of the arrangement of FIG. 13A not discussed in further detail may be assumed to correspond to the features with equivalent reference numerals as discussed above, including any potential variations in the features.

The alignment of the substrate 12 with the waveguide 1 will now be described.

Figure 13B:
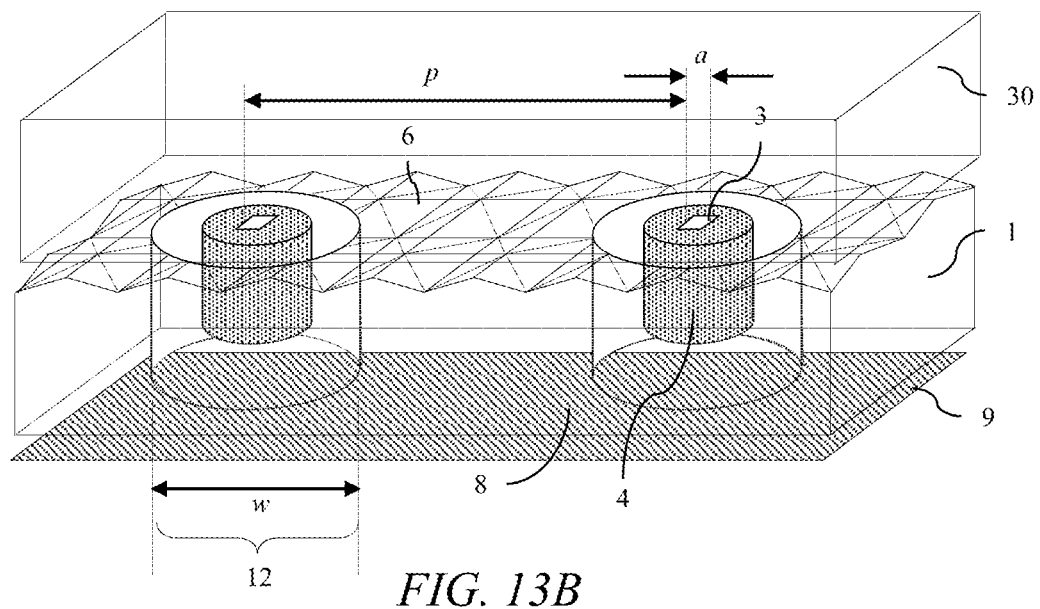
FIG. 13B is a schematic diagram illustrating in side perspective view the array of LEDs of FIG. 13A aligned with the optical waveguide.

FIG. 13B is a schematic diagram illustrating in side perspective view the array of LEDs of FIG. 13A aligned with the optical waveguide. The pitch p of the light input features 12 is substantially the same as the pitch of the LEDs 3. The width w of the light input features 12 may be provided to maintain alignment during thermal cycling of the backlight 20. The material of the substrate 30 and waveguide 1 may be the same or may have substantially the same coefficients of thermal expansion. The waveguide 1 may be a glass material in the case that the substrate 30 is a glass material. The features 12 may be formed by means of laser processing of the substrate 30.

Advantageously uniformity and efficiency may be maintained over the desirable operating temperature range.

Features of the arrangement of FIG. 13B not discussed in further detail may be assumed to correspond to the features with equivalent reference numerals as discussed above, including any potential variations in the features.

Other arrangements of surface relief extraction features 32 will now be described.

Figure 14A:
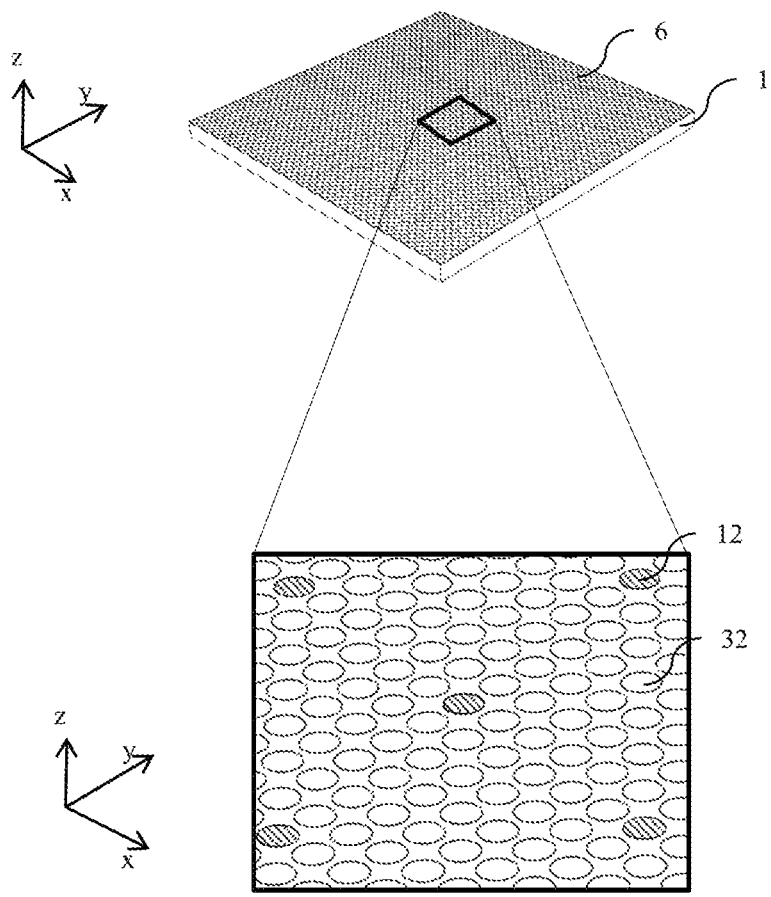
FIG. 14A is a schematic diagram illustrating in side perspective view an optical waveguide comprising an array of circular light extracting features.
Figure 14B:
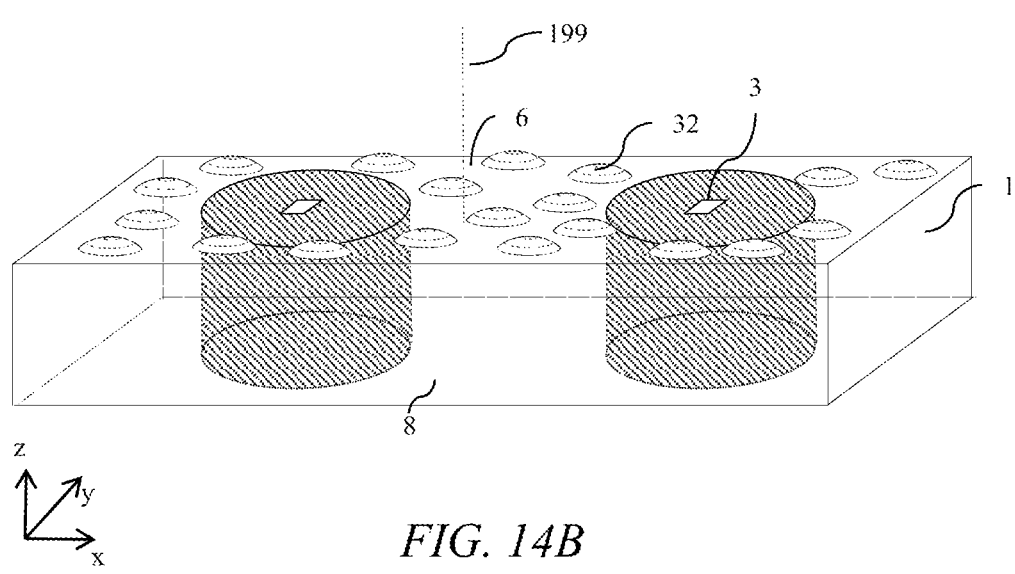
FIG. 14B is a schematic diagram illustrating in side perspective view the optical waveguide of FIG. 14A aligned to an array of LEDs.

FIG. 14A is a schematic diagram illustrating in side perspective view an optical waveguide comprising an array of domed surface relief extracting features 32; and FIG. 14B is a schematic diagram illustrating in side perspective view the optical waveguide of FIG. 14A aligned to an array of LEDs. Features of the arrangements of FIGS. 14A-B not discussed in further detail may be assumed to correspond to the features with equivalent reference numerals as discussed above, including any potential variations in the features.

In comparison to the waveguide 1 of FIG. 3A the features 32 are spherical domes with a radius of curvature that provides a maximum tilt angle at the cusp of each dome. In comparison to the facets 32a-d of FIG. 3B, the domed features 32 of FIG. 14A-B may be easier to tool and replicate.

An illustrative embodiment will now be described with reference to the structure of the above figures and the optical properties described in TABLE 1A modified by the light extraction features of TABLE 4 and FIGS. 15A-C.

TABLE 4

| Item | Property | Illustrative example |
|---|---|---|
| Light extraction feature 32 | Shape | Spherical dome |
| | Diameter | 0.2 mm |
| | Cusp tilt | 5° |
| | Pitch | 0.24 mm |

Figure 15A:
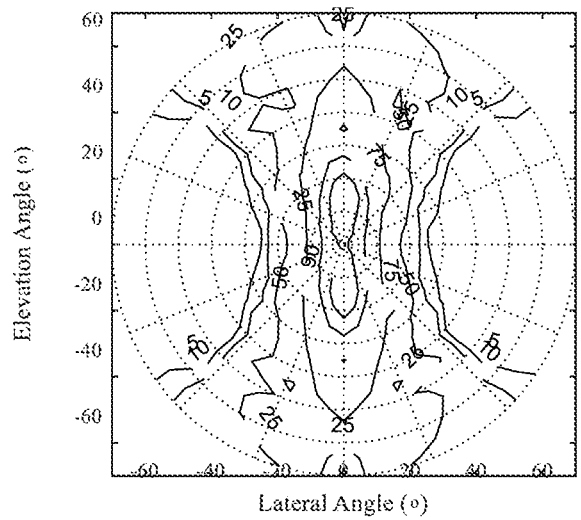
FIG. 15A is a schematic graph of the polar output distribution of the arrangement of FIG. 1A with no output diffuser, waveguide of FIG. 14A and the light turning element of FIG. 4.
Figure 15B:
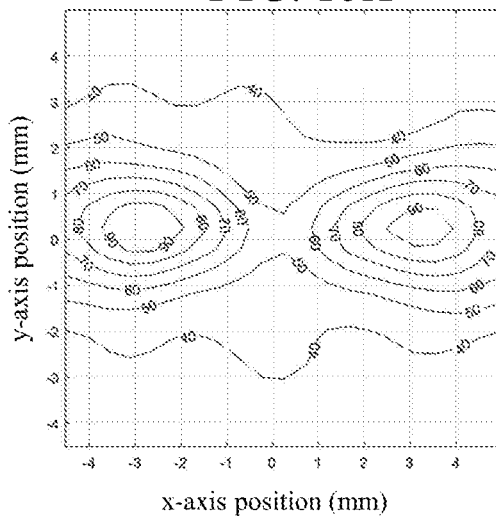
FIG. 15B is a schematic graph of the spatial distribution of uniformity of light output in a direction along the normal to the predetermined area of the arrangement of FIG. 1A with a weak symmetric diffuser, waveguide of FIG. 14A and the light turning element of FIG. 4.
Figure 15C:
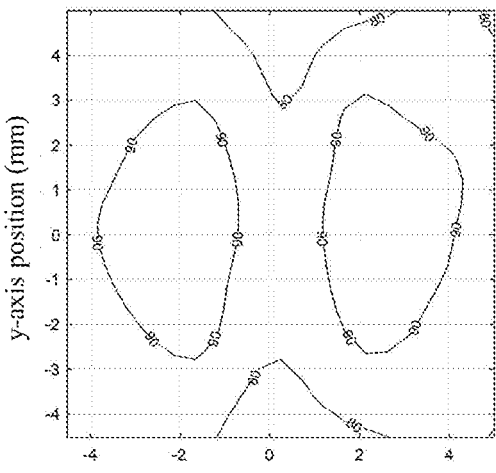
FIG. 15C is a schematic graph of the spatial distribution of uniformity of light output in a direction along the normal to the predetermined area of the arrangement of FIG. 1A with a strong symmetric diffuser, waveguide of FIG. 14A and the light turning element of FIG. 4.

FIG. 15A is a schematic graph of the polar output distribution of the arrangement of FIG. 1A with no output diffuser, waveguide of FIG. 14A and the light turning element of FIG. 4; FIG. 15B is a schematic graph of the spatial distribution of uniformity of light output in a direction along the normal to the predetermined area of the arrangement of FIG. 1A with a weak symmetric diffuser, waveguide of FIG. 14A and the light turning element of FIG. 4; and FIG. 15C is a schematic graph of the spatial distribution of uniformity of light output in a direction along the normal to the predetermined area of the arrangement of FIG. 1A with a strong symmetric diffuser, waveguide of FIG. 14A and the light turning element of FIG. 4.

In comparison to the output of FIGS. 6A-C a broader output profile may be achieved.

Other arrangements of waveguide 1 light extraction features may be provided in the present embodiments.

Figure 16:
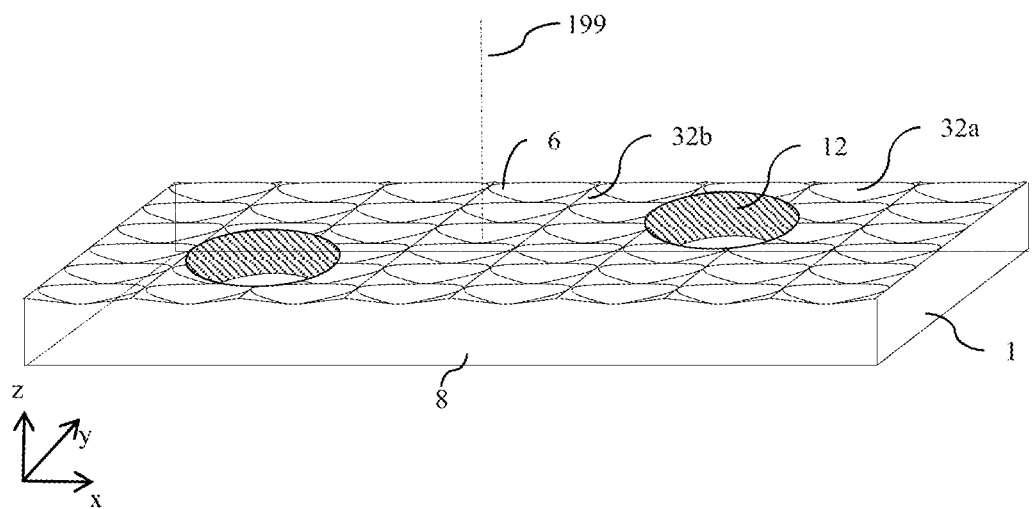
FIG. 16 is a schematic diagram illustrating in side perspective view an optical waveguide comprising an array of elongate curved light extracting features and a crossed array of linear light extraction features.

FIG. 16 is a schematic diagram illustrating in side perspective view an optical waveguide comprising an array of lenticular light extracting features 32a that are elongate in the x-direction and a crossed array of planar light extraction features 32b that are elongate in the y-direction. Such an array may advantageously achieve control of output distributions in the lateral and elevation polar directions.

Features of the arrangement of FIG. 16 not discussed in further detail may be assumed to correspond to the features with equivalent reference numerals as discussed above, including any potential variations in the features.

It may be desirable to provide an opaque substrate for mounting the LEDs 3.

Figure 17:
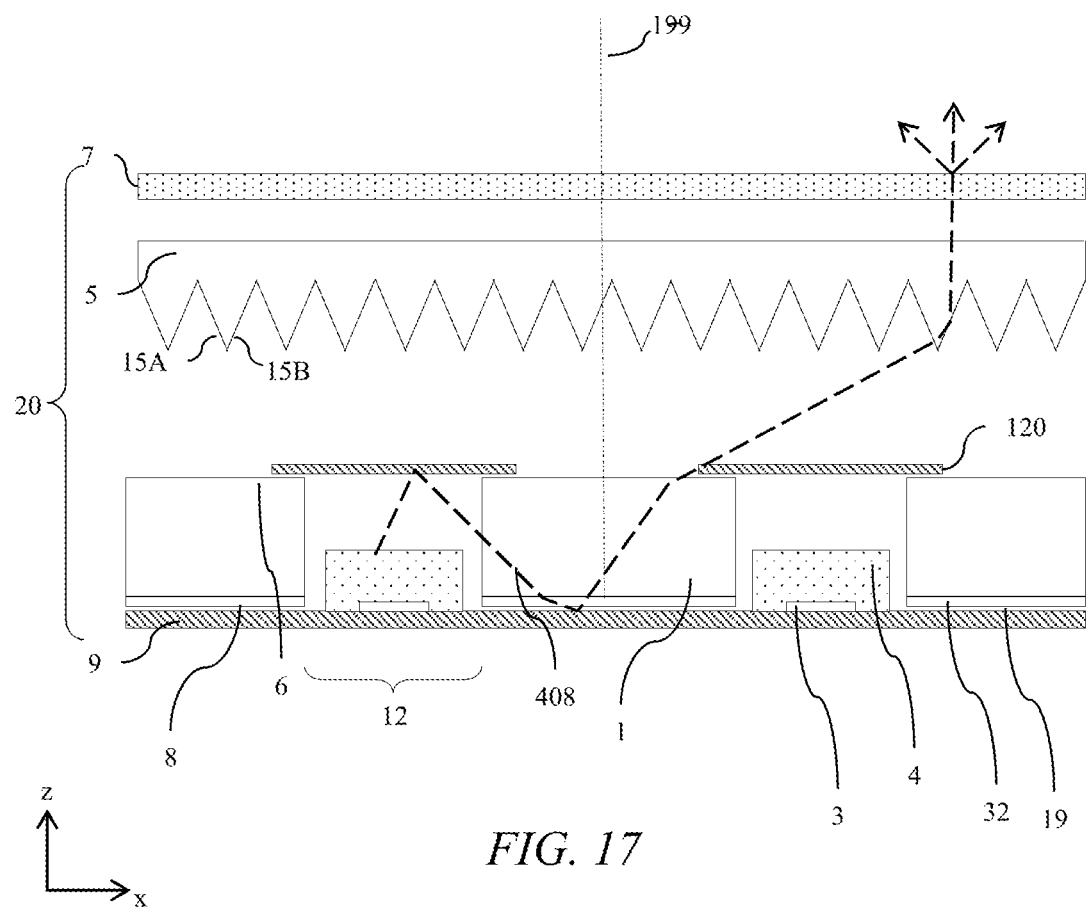
FIG. 17 is a schematic diagram illustrating in side view an optical stack of a backlight wherein the array of LEDs is arranged to direct output light in a forwards direction and comprising an array of apertures in the waveguide.

FIG. 17 is a schematic diagram illustrating in side view an optical stack of a backlight wherein the array of LEDs is arranged to direct output light in a forwards direction and comprising an array of apertures for the light input features 12 in the waveguide 1.

Features of the arrangement of FIG. 17 not discussed in further detail may be assumed to correspond to the features with equivalent reference numerals as discussed above, including any potential variations in the features.

The light emitting diodes 3 are located behind the waveguide 1 and arranged to emit light rays 408 forwardly.

The illumination apparatus 20 further comprises light shields 120 arranged to prevent light exiting from the front of the aperture of light input features 12.

In the embodiment of FIG. 17, the rear light guiding surface comprises surface relief extraction features 32, that may have the profiles as described in FIGS. 3A-B, FIG. 14A or FIG. 16 for example.

Rear reflector 9 extends across and is separated by air gap 19 from the rear light guiding surface 8, the rear reflector 9 being arranged to reflect light ray 408 incident thereon and redirect it through the waveguide 1.

Advantageously light throughput efficiency may be increased as losses at the transparent substrate 30 of FIG. 1A for example are not present.

It may be desirable to provide no light shields 120.

Figure 18:
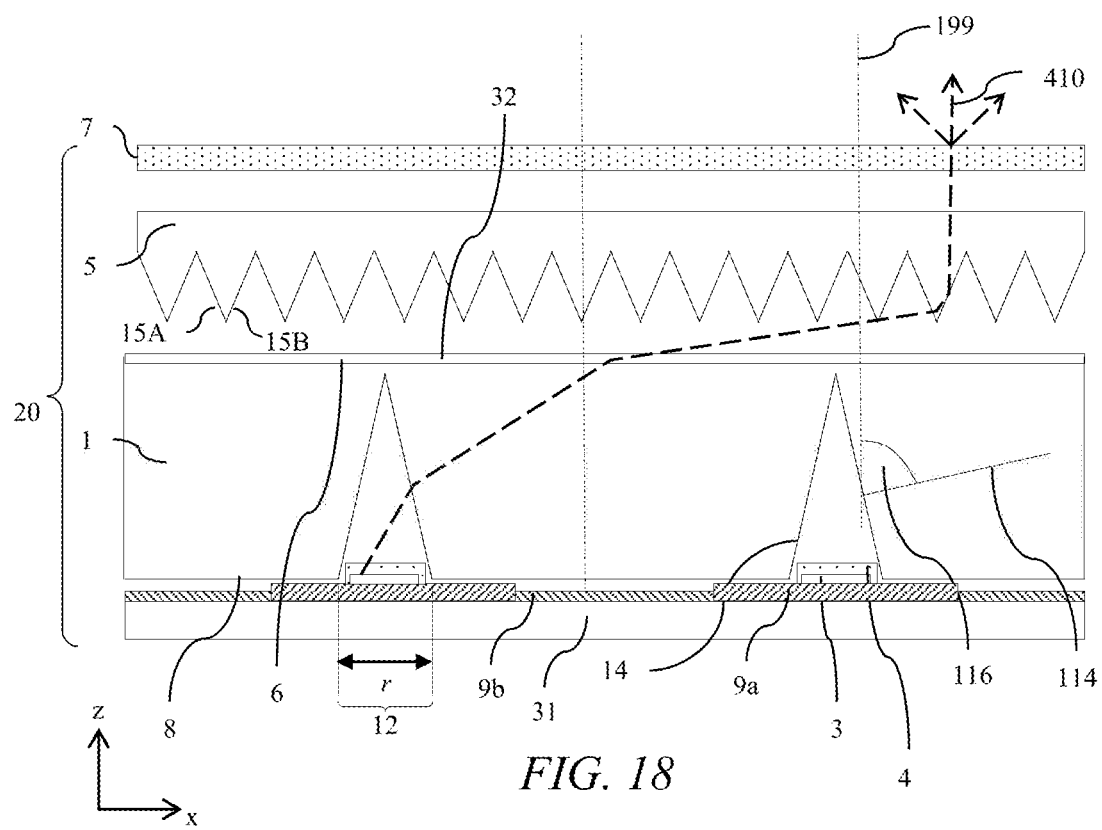
FIG. 18 is a schematic diagram illustrating in side view an optical stack of a backlight wherein the array of LEDs is arranged to direct output light in a forwards direction and comprising an array of conical recesses in the waveguide.
Figure 19:
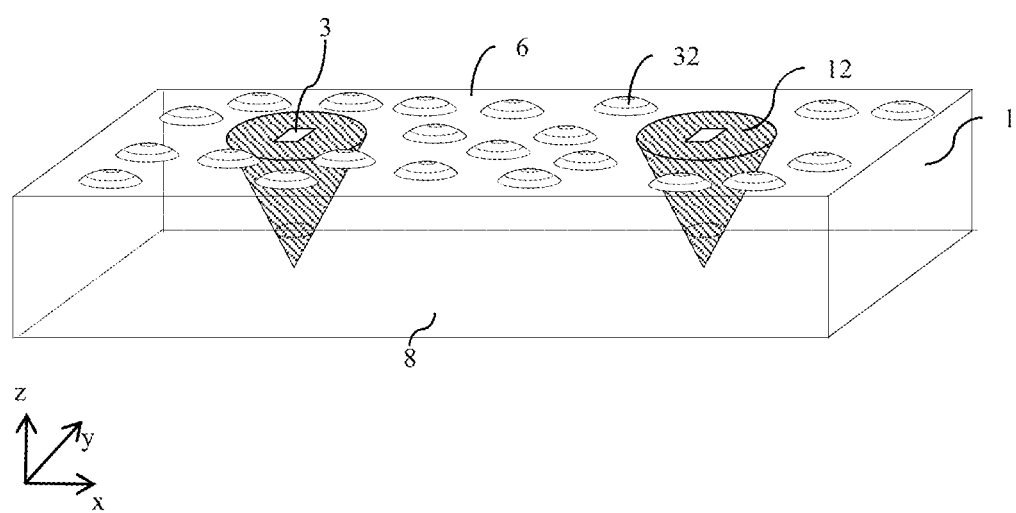
FIG. 19 is a schematic diagram illustrating in side perspective view an optical waveguide comprising an array of conical recesses in the waveguide and aligned LEDs.

FIG. 18 is a schematic diagram illustrating in side view an optical stack of a backlight 20 wherein the array of LEDs is arranged to direct output light rays 410 in a forwards direction and comprising an array of light input features 12 that are conical recesses in the waveguide 1; and FIG. 19 is a schematic diagram illustrating in side perspective view an optical waveguide comprising an array of conical recesses in the waveguide 1 and aligned LEDs.

Features of the arrangements of FIGS. 18-19 not discussed in further detail may be assumed to correspond to the features with equivalent reference numerals as discussed above, including any potential variations in the features.

The light input features 12 are recesses extending part way though the waveguide 1 that in FIG. 18 are conical recesses. The conical recesses have minimum surface 14 normal 114 tilt 116 with respect to the normal 199 to the predetermined area of at least 84 degrees, and preferably at least 86 degrees.

In comparison to the embodiment of FIG. 17, light input is directed by refraction into the waveguide 1 without light shields 120. Advantageously complexity and cost of manufacture is reduced. Hot spots near the LEDs 3 are reduced. Efficiency is increased in comparison to arrangements with transparent substrate 30.

In the embodiment of FIG. 17 the LEDs 3 are illustrated as formed on the rear reflector 9. The rear reflector 9 may be formed as one or more separate layers on an opaque substrate 31, for example by reflective regions 9a to the rear of the LEDs 3 and reflective regions 9b between the regions 9a. Advantageously the substrate 31 may be provided in materials suitable for manufacture, for example glass or polymers such as acrylates, PMMA, PET, PC, COP and other known transparent polymers. Such materials may be further provided with appropriate coefficient of thermal expansion in comparison to that of the waveguide 1 to minimise thermal misalignments during operation.

The recesses have an opening width r at the end at which light enters from the light emitting diodes that is at most 500% of the width (or diameter), w of the light emitting diodes 3, preferably at most 300% of the width, w of the light emitting diodes 3 and most preferably at most 200% of the width, w of the light emitting diodes 3. Advantageously light rays 410 may be coupled efficiently into the waveguide 1.

Figure 20:
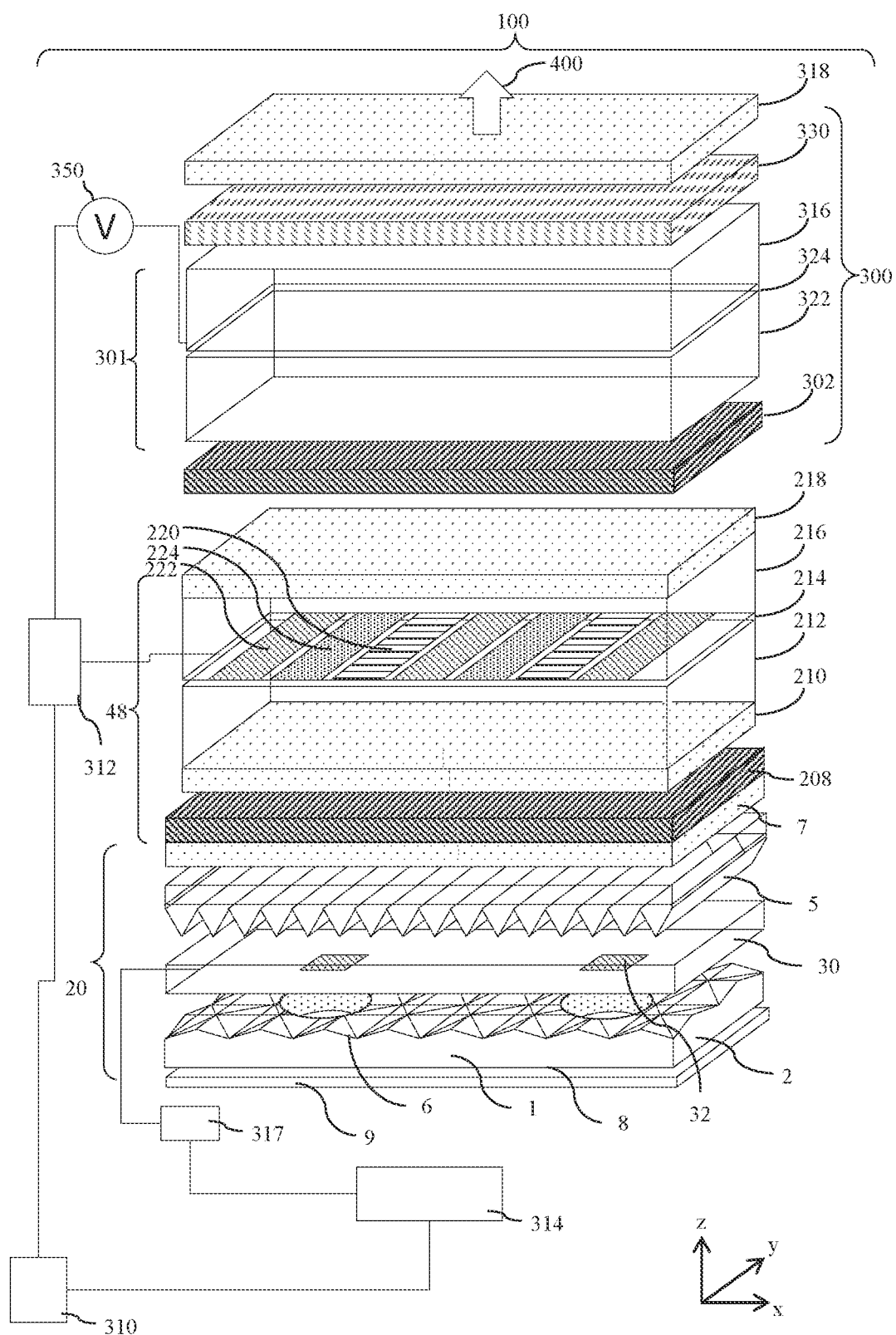
FIG. 20 is a schematic diagram illustrating in side perspective view an optical stack of a high efficiency and high dynamic range privacy display device comprising an array backlight arranged to illuminate a spatial light modulator, a reflective polariser and a polar control retarder arrangement.

FIG. 20 is a schematic diagram illustrating in side perspective view an optical stack of a high efficiency and high dynamic range privacy display device 100 comprising an array backlight 20 arranged to illuminate a spatial light modulator 48, a reflective polariser 302 and a polar control retarder arrangement 300. Features of the arrangement of FIG. 20 not discussed in further detail may be assumed to correspond to the features with equivalent reference numerals as discussed above, including any potential variations in the features.

Switchable liquid crystal retarder stack 300 is arranged in series with the backlight 20 and spatial light modulator 48. Stack 300 comprises a switchable liquid crystal retarder 301 that comprises substrates 322, 316 with transparent electrodes and alignment layers to provide controllable alignment of a liquid crystal layer 324. Stack 300 further comprises an additional polarizer 318 and compensation retarder 330. Various embodiments are described in U.S. Pat. No. 10,126,575 and in U.S. Pat. No. 10,303,030, both of which are herein incorporated by reference in their entireties, and in U.S. Patent Publ. No. 2020-0159055, also herein incorporated by reference in its entirety.

An illustrative embodiment for polarisation control retarder 300 is given in TABLE 5 and polar profiles in privacy and public mode.

TABLE 5

| | Passive polar control retarder(s) | | Active LC retarder | | | | |
|---|---|---|---|---|---|---|---|
| Mode | Type | Δn.d/ nm | Alignment layers | Pretilt/ deg | Δn.d/ nm | Δε | Voltage/ V |
| Public | Crossed A | +500 @ 45° | Homogeneous | 2 | 750 | 13.2 | 10 |
| Privacy | | +500 @ 135° | Homogeneous | 2 | | | 2.3 |

Figure 21A:
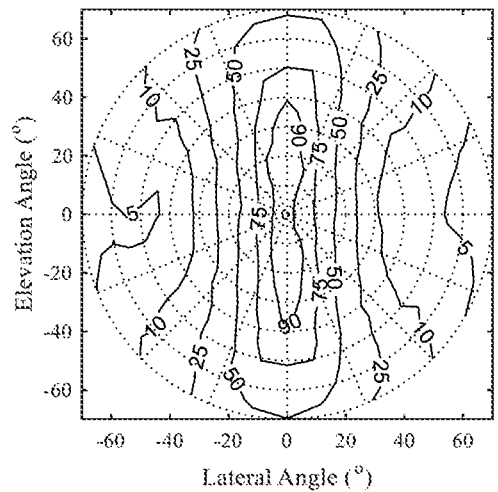
FIG. 21A is a schematic graph of the polar output distribution of luminance for the arrangement of FIG. 1A and the light turning element of FIG. 4 in series with a 30 degree FWHM output diffuser.
Figure 21B:
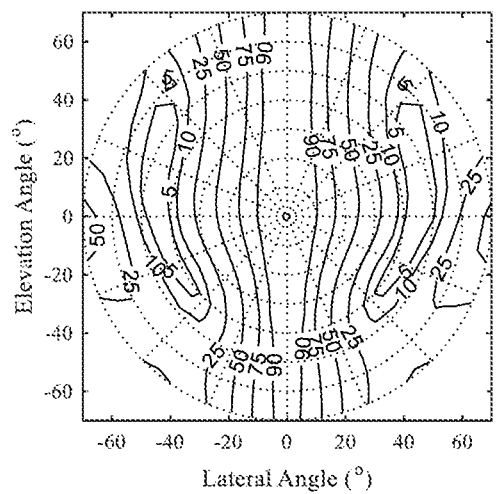
FIG. 21B is a schematic graph of the polar output distribution of transmission for a retarder stack arrangement of FIG. 20 with illustrative retarder stack arrangement of TABLE
Figure 21C:
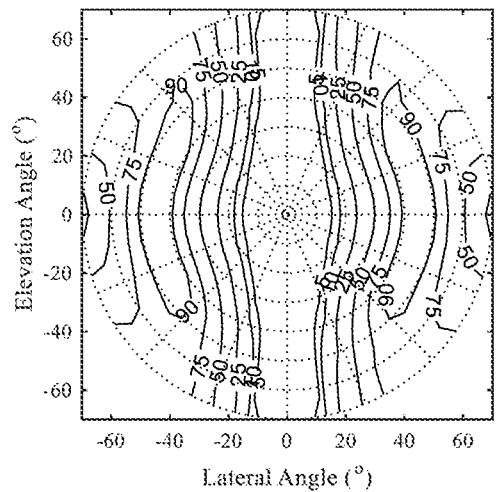
FIG. 21C is a schematic graph of the polar output distribution of reflectivity for a retarder stack arrangement of FIG. 20 with illustrative retarder stack arrangement of TABLE 5.

FIG. 21A is a schematic graph of the polar output distribution of luminance for the arrangement of FIG. 1A and the light turning element of FIG. 4 in series with a 30 degree FWHM output diffuser 7; FIG. 21B is a schematic graph of the polar output distribution of transmission for a retarder stack arrangement of FIG. 20 with illustrative retarder stack arrangement of TABLE 5; and FIG. 21C is a schematic graph of the polar output distribution of reflectivity for a retarder stack arrangement of FIG. 20 with illustrative retarder stack arrangement of TABLE 5.

Figure 22A:
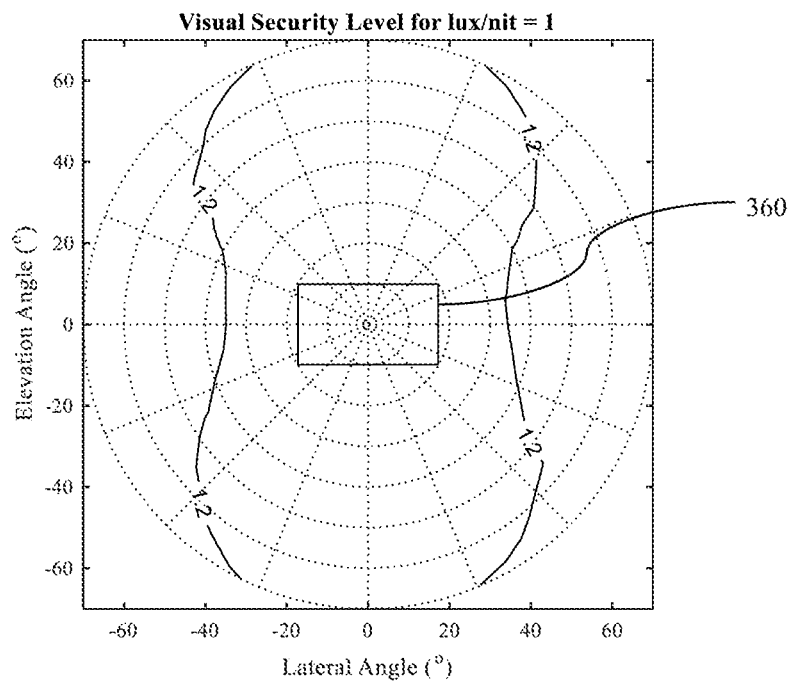
FIG. 22A is a schematic graph of the polar output distribution of Visual Security Level for a retarder stack arrangement of FIG. 20 with illustrative retarder stack arrangement of TABLE 5 and a lux/nit ratio of 1.0 in a public mode of operation.
Figure 22B:
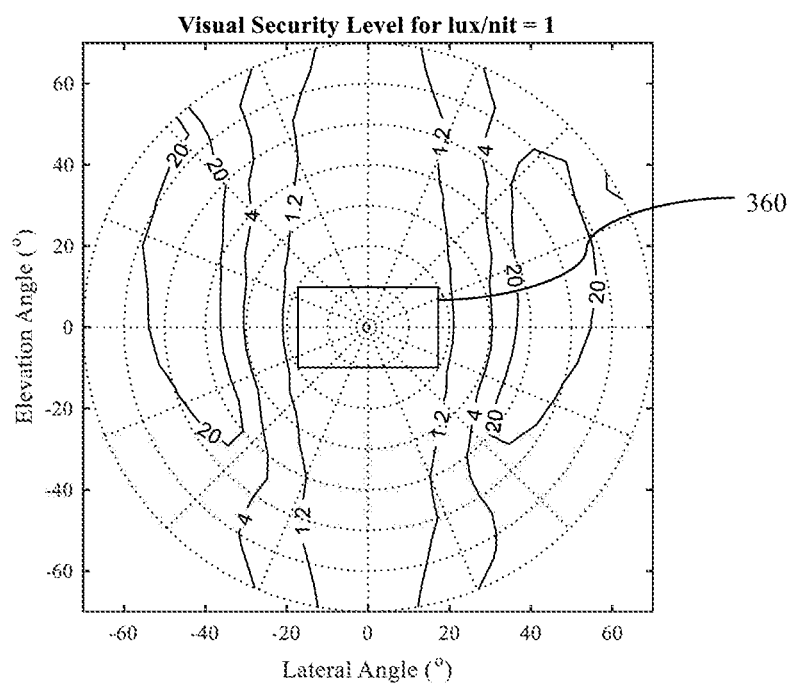
FIG. 22B is a schematic graph of the polar output distribution of Visual Security Level for a retarder stack arrangement of FIG. 20 with illustrative retarder stack arrangement of TABLE 5 and a lux/nit ratio of 1.0 in a privacy mode of operation.

FIG. 22A is a schematic graph of the polar output distribution of Visual Security Level for a retarder stack arrangement of FIG. 20 with illustrative retarder stack arrangement of TABLE 5 and a lux/nit ratio of 1.0 in a public mode of operation; and FIG. 22B is a schematic graph of the polar output distribution of Visual Security Level for a retarder stack arrangement of FIG. 20 with illustrative retarder stack arrangement of TABLE 5 and a lux/nit ratio of 1.0 in a privacy mode of operation. Region 360 represents the polar angles seen by a typical head-on user of a 14 inch diagonal 16:9 aspect ratio display viewed from 500 mm. All regions of the image have a VSL of less than 1.2, advantageously achieving high image visibility across the display area for the display user.

FIG. 22A further shows that the display has high image visibility in public mode of operation over a wide polar region while FIG. 22B illustrates high visual security level (VSL>4) over a wide polar region for snoopers.

Advantageously a switchable privacy display with high image visibility to display users and high visual security level to snoopers is provided.

Switchable liquid crystal retarder stack 300 and spatial light modulator 48 are arranged to receive light transmitted by the light turning element 5. Diffuser 7 may be arranged to provide modification of output cone angle and further to minimise Moiré and mura artefacts.

The control system may further comprise switchable liquid crystal retarder stack 300 controller 312 to control the voltage across the liquid crystal retarder 301. Controller 312 is arranged to address voltage driver 350 such that the switchable liquid crystal retarder 301 is driven in a first alignment state when the display operates in a wide angle mode, and in a second alignment state when the display operates in a narrow angle privacy mode.

Figure 23:
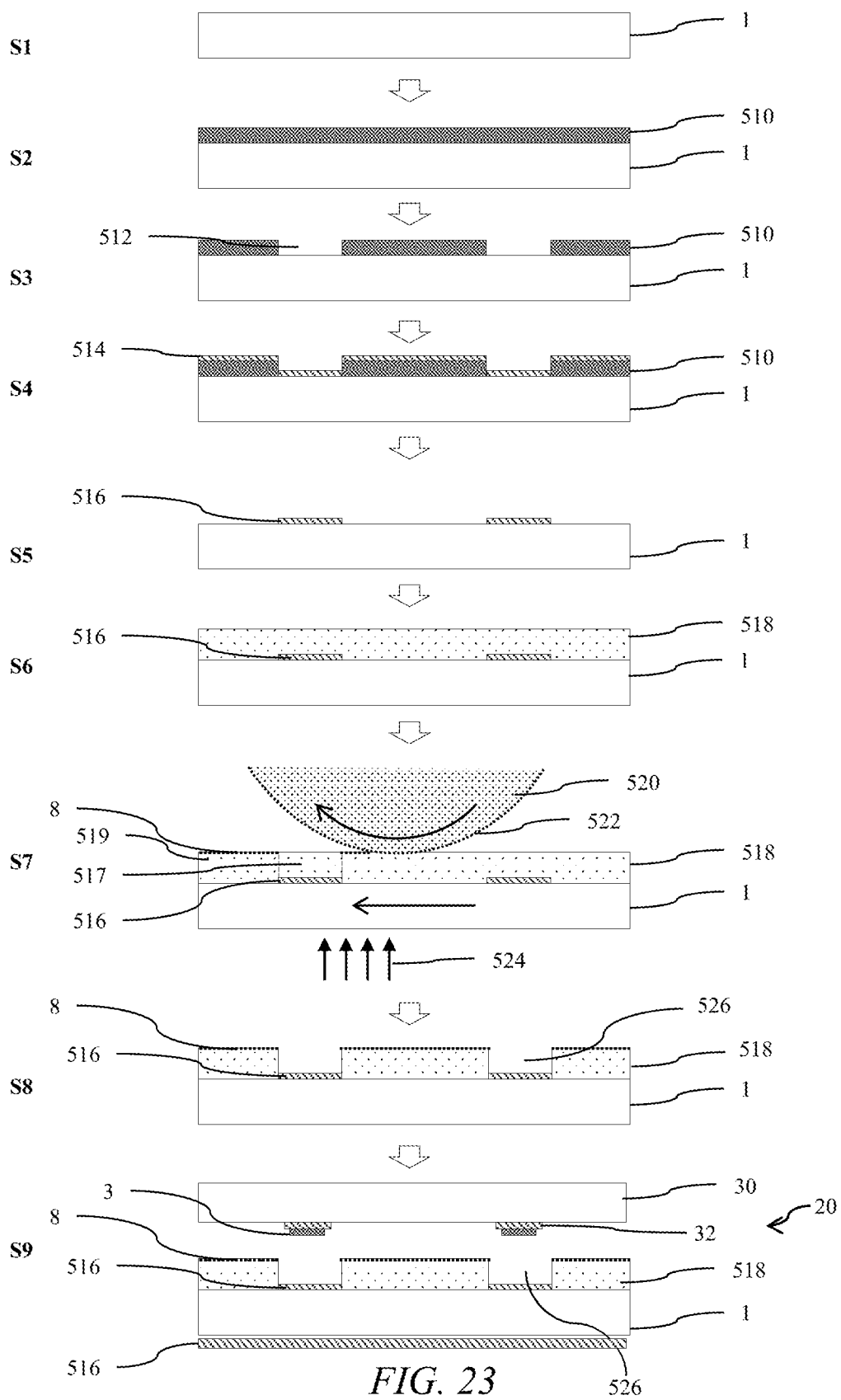
FIG. 23 is a flowchart illustrating a method to manufacture an illumination apparatus.

FIG. 23 is a flowchart illustrating a method to manufacture an illumination apparatus.

In a first step S1 a transparent waveguide 1 substrate is provided.

In a second step S2 a photoresist layer 510 is provided on the waveguide 1 substrate.

In a third step S3 known mask exposure methods are used to form aperture regions 512 in the photoresist layer 510.

In a fourth step S4 a metal layer 514 is provided over the layer 510 and aperture regions 512.

In a fifth step S5 the photoresist 510 is removed to leave metal regions 516.

In a sixth step S6 a layer of curable transparent material 518 is applied to the substrate 1 so that the metal regions 516 are covered.

In a seventh step S7 roller 520 with microstructure 522 arranged on its surface is rolled onto the layer 518 and collimated UV light 524 is arranged to illuminate through the waveguide 1 substrate and form microstructure on the second surface 8 of the waveguide 1. The regions 517 that are obscured from the UV light 524 do not cure while the regions 519 that are not obscured are cured.

In an eighth step S8 the uncured material that is in the region 517 is removed, for example by washing. Hole regions 526 are formed in the layer 518 of the waveguide 1.

In a ninth step S9, the array of light sources 3 are aligned to the waveguide 1 and rear reflector 9. Advantageously the metal regions 516 provide reflection of light rays from the light emitting diodes 3 is coupled into the waveguide 1, in a similar manner to that illustrated in FIG. 1B. By comparison the through-holes and rear reflector 9 of FIG. 1B, the metal regions 516 advantageously achieve reduced visibility of hot spots near to the light emitting diodes 3.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. An illumination apparatus for providing illumination over a predetermined area, the illumination apparatus comprising:
   a two-dimensional array of light emitting diodes disposed on a support substrate, the light emitting diodes being arrayed across the predetermined area;
   a waveguide comprising:
      an array of light input features, each light input feature being aligned to at least one light emitting diode of the array of light emitting diodes, the light input features being arranged to input light from the at least one aligned light emitting diode into the waveguide; and
      front and rear light guiding surfaces extending across said predetermined area and arranged to guide light received from the array of light emitting diodes along the optical waveguide by total internal reflection, wherein at least one of the front and rear light guiding surfaces comprises surface relief extraction features that are arranged to extract light from the light guided in the waveguide through the at least one of the front and rear light guiding surfaces;
   a light turning element arranged in front of the waveguide and comprising light turning surfaces arranged to receive the extracted light and redirect it towards the normal to the predetermined area; and
   a rear reflector extending across and separated from the rear light guiding surface, the rear reflector being arranged to reflect light incident thereon and redirect it through the waveguide,
   wherein more than 50% of the light output from the waveguide is at an angle to the normal to the waveguide of greater than 70 degrees.

2. The illumination apparatus according to claim 1, wherein the light emitting diodes are located proximate a front side of the waveguide and arranged to emit light rearwardly.

3. The illumination apparatus according to claim 2, wherein the support substrate is transparent to light from the light emitting diodes.

4. The illumination apparatus according to claim 1, wherein the light emitting diodes are located proximate a rear side of the waveguide and arranged to emit light forwardly.

5. The illumination apparatus according to claim 1, wherein the light input features have a minimum pitch, and the light emitting diodes have a maximum width that is at most 5% of the minimum pitch of the light input features.

6. The illumination apparatus according to claim 1, wherein the light emitting diodes have a maximum width of at most 300 micrometers.

7. The illumination apparatus according to claim 1, wherein a light scattering element is arranged between the light emitting diodes and the waveguide.

8. The illumination apparatus according to claim 7, wherein the light scattering element comprises colour conversion material.

9. The illumination apparatus according to claim 7, wherein the height of the light scattering element is greater than 15% of the thickness of the waveguide.

10. The illumination apparatus according to claim 1, wherein the light input features are apertures that extend entirely through the waveguide.

11. The illumination apparatus according to claim 10, wherein the apertures are parallel sided in at least one cross-sectional plane comprising the normal to the predetermined area.

12. The illumination apparatus according to claim 10, wherein the apertures have a width at the end at which light enters from the light emitting diodes that is at most 500% of the width of the light emitting diodes.

13. The illumination apparatus according to claim 7, wherein the width of the light scattering element is less than the width of the apertures.

14. The illumination apparatus according to claim 10, wherein the light emitting diodes are proximate a rear side of the waveguide and arranged to emit light forwardly and the illumination apparatus further comprises light shields arranged to prevent light exiting from the front of the apertures.

15. The illumination apparatus according to claim 1, wherein the light input features are recesses extending part way though the waveguide.

16. The illumination apparatus according to claim 15, wherein the recesses are conical recesses.

17. The illumination apparatus according to claim 16, wherein the conical recesses have minimum surface normal tilt with respect to the normal to the predetermined area of at least 84 degrees.

18. The illumination apparatus according to claim 1, wherein the surface relief extraction features have a maximum surface normal tilt with respect to the normal to the predetermined area that is at most 10 degrees.

19. The illumination apparatus according to claim 1, wherein the surface relief extraction features have a maximum surface normal tilt with respect to the normal to the predetermined area that is at least 1 degree.

20. The illumination apparatus according to claim 1, wherein the light output from the waveguide is at an angle to the normal to the waveguide of at least 60 degrees.

21. The illumination apparatus according to claim 1, wherein the direction of light output from the waveguide with maximum luminous intensity is at an angle to the normal to the waveguide of greater than 70 degrees.

22. The illumination apparatus according to claim 1, wherein the front light guiding surface comprises surface relief extraction features.

23. The illumination apparatus according to claim 1, wherein the rear light guiding surface comprises surface relief extraction features.

24. The illumination apparatus according to claim 1, wherein the light turning surfaces are planar.

25. The illumination apparatus according to claim 1, wherein the light turning surfaces are arranged in pairs that are symmetric in a plane comprising the normal to the predetermined area.

26. The illumination apparatus according to claim 1, wherein the light turning surfaces are arranged in a one-dimensional array.

27. The illumination apparatus according to claim 1, wherein the light turning surfaces are arranged in a two-dimensional array.

28. The illumination apparatus according to claim 1, wherein the light turning surfaces are surfaces of an array of prisms or an array of cones.

29. The illumination apparatus according to claim 1, wherein the light turning surfaces have a surface normal tilt relative to the normal to the predetermined area of at least 62.5 degrees.

30. The illumination apparatus according to claim 1, wherein the light turning surfaces have a surface normal tilt relative to the normal to the predetermined area of at most 72.5 degrees.

31. The illumination apparatus according to claim 1, wherein the light turning surfaces are disposed on the rear side of the light turning element.

32. The illumination apparatus according to claim 1, wherein the rear reflector is planar.

33. A display apparatus comprising a transmissive spatial light modulator and an illumination apparatus according to claim 1, arranged to provide illumination to the transmissive spatial light modulator.

34. The display apparatus according to claim 33, further comprising a control system arranged to control the luminous flux of the light emitted from the light emitting diodes.

35. The display apparatus according to claim 34, wherein the control is in response to image data supplied to the transmissive spatial light modulator.

* * * * *